(12) United States Patent
Richert et al.

(10) Patent No.: US 10,322,603 B2
(45) Date of Patent: *Jun. 18, 2019

(54) PRINTING DIFFRACTION GRATINGS ON PAPER AND BOARD

(71) Applicant: BASF SE, Ludwigshafen (DE)

(72) Inventors: Michelle Richert, Illzach (FR); Thomas Bolle, Efringen-Kirchen (DE); Roland Fleury, Zwingen (CH)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/578,657

(22) Filed: Dec. 22, 2014

(65) Prior Publication Data

US 2015/0137504 A1 May 21, 2015

Related U.S. Application Data

(63) Continuation of application No. 14/127,292, filed as application No. PCT/IB2012/053100 on Jun. 20, 2012, now Pat. No. 8,993,219.

(Continued)

(30) Foreign Application Priority Data

Jun. 21, 2011 (EP) .................................... 11170647

(51) Int. Cl.
    *G03H 1/04*      (2006.01)
    *B41M 7/00*      (2006.01)
    (Continued)

(52) U.S. Cl.
    CPC .......... *B42D 25/405* (2014.10); *B05D 3/067* (2013.01); *B41M 3/148* (2013.01); *B41M 7/00* (2013.01);
    (Continued)

(58) Field of Classification Search
None
See application file for complete search history.

(56) References Cited

U.S. PATENT DOCUMENTS 3,409,500 A    11/1968   Strazdins et al.
3,607,282 A    9/1971   Grant, Jr.
(Continued)

FOREIGN PATENT DOCUMENTS

CN      101746202     6/2010
EP      0 338 378 A2     10/1989
(Continued)

OTHER PUBLICATIONS

"Photoinitiators for UV Curing; Key Products Selection Guide 2003", Ciba specialty Chemicals (8 pages) (2003).*

(Continued)

*Primary Examiner* — Martin J Angebranndt
(74) *Attorney, Agent, or Firm* — Oblon, McClelland, Maier & Neustadt, L.L.P.

(57) ABSTRACT

A method and an apparatus for forming a surface relief microstructure, especially an optically variable image on a paper substrate are provided, the method comprising the steps of: A) applying a curable composition to at least a portion of the frontside of the paper substrate; B) contacting at least a portion of the curable composition with surface relief microstructure, especially optically variable image forming means; C) curing the composition by using at least one UV lamp (1, 2, 3) which is arranged on the backside of the paper substrate; D) optionally depositing a layer of a transparent high refractive index material and/or a metallic layer on at least a portion of the cured composition, wherein the lamp (1, 2, 3) having emission peak(s) in the UV-A and near VIS range and the curable composition comprises at least a photoinitiator which absorbs in the UV-A region and preferably in the near VIS range. A paper product obtainable (Continued)

uses the method and an apparatus for forming a surface relief microstructure on a paper substrate. Surface relief microstructures, such as holograms may be replicated rapidly and with accuracy on a paper substrate by using the method and the apparatus.

17 Claims, 2 Drawing Sheets

Related U.S. Application Data

(60) Provisional application No. 61/499,187, filed on Jun. 21, 2011.

(51) Int. Cl.

| | | |
|---|---|---|
| *B41M 3/14* | (2006.01) | |
| *B42D 25/23* | (2014.01) | |
| *B42D 25/24* | (2014.01) | |
| *B42D 25/328* | (2014.01) | |
| *B42D 25/324* | (2014.01) | |
| *B42D 25/30* | (2014.01) | |
| *B42D 25/378* | (2014.01) | |
| *B42D 25/405* | (2014.01) | |
| *B42D 25/21* | (2014.01) | |
| *B42D 25/373* | (2014.01) | |
| *G03H 1/02* | (2006.01) | |
| *B42D 25/42* | (2014.01) | |
| *B42D 25/425* | (2014.01) | |
| *B42D 25/29* | (2014.01) | |
| *B05D 3/06* | (2006.01) | |
| *B41M 3/06* | (2006.01) | |
| *B41M 1/24* | (2006.01) | |
| *G03H 1/18* | (2006.01) | |

(52) U.S. Cl.
CPC ............ *B42D 25/21* (2014.10); *B42D 25/23* (2014.10); *B42D 25/24* (2014.10); *B42D 25/29* (2014.10); *B42D 25/30* (2014.10); *B42D 25/328* (2014.10); *B42D 25/373* (2014.10); *B42D 25/42* (2014.10); *B42D 25/425* (2014.10); *G03H 1/028* (2013.01); *B41M 1/24* (2013.01); *B41M 3/06* (2013.01); *B41M 7/0081* (2013.01); *B42D 25/324* (2014.10); *B42D 2033/10* (2013.01); *B42D 2033/30* (2013.01); *G03H 2001/185* (2013.01); *G03H 2250/36* (2013.01); *G03H 2270/12* (2013.01)

(56) References Cited

U.S. PATENT DOCUMENTS

| | | | |
|---|---|---|---|
| 3,862,333 A | | 1/1975 | Chalupa et al. |
| 3,980,478 A | | 9/1976 | Crawford et al. |
| 4,151,175 A | | 4/1979 | Crivello et al. |
| 4,399,071 A | | 8/1983 | Crivello et al. |
| 4,694,029 A | | 9/1987 | Land |
| 4,856,857 A | | 8/1989 | Takeuchi et al. |
| 4,906,315 A | | 3/1990 | McGrew |
| 4,950,581 A | | 8/1990 | Koike et al. |
| 5,820,971 A | | 10/1998 | Kaule et al. |
| 5,948,199 A | | 9/1999 | McGrew |
| 6,132,558 A | | 10/2000 | Dyllick-Brenzinger et al. |
| 6,306,555 B1 | | 10/2001 | Schulz et al. |
| 7,173,071 B2 | | 2/2007 | Suhadoinik et al. |
| 7,954,430 B2 | | 6/2011 | Chretien et al. |
| 8,820,906 B2 * | | 9/2014 | Miura ................ C09D 11/101 347/100 |
| 8,993,219 B2 * | | 3/2015 | Richert et al. ............ 430/321 |
| 2003/0164580 A1 * | | 9/2003 | Rinker et al. .............. 264/496 |
| 2004/0241404 A1 | | 12/2004 | Shiao |
| 2004/0242735 A1 | | 12/2004 | McMan et al. |
| 2005/0063066 A1 * | | 3/2005 | Namioka ............ G02B 5/0221 359/613 |
| 2006/0275669 A1 | | 12/2006 | Casitas |
| 2007/0070503 A1 | | 3/2007 | Boswell et al. |
| 2007/0231566 A1 * | | 10/2007 | Yoneyama ............ G02B 1/105 428/331 |
| 2008/0295646 A1 | | 12/2008 | Mirkin et al. |
| 2008/0318150 A1 | | 12/2008 | Agrawal et al. |
| 2009/0056858 A1 | | 3/2009 | Casitas et al. |
| 2009/0135239 A1 | | 5/2009 | Chretien et al. |
| 2010/0090455 A1 | | 4/2010 | Boswell et al. |
| 2012/0002255 A1 | | 1/2012 | Boswell et al. |

FOREIGN PATENT DOCUMENTS

| | | | | |
|---|---|---|---|---|
| EP | 0 540 450 A1 | | 5/1993 | |
| EP | 0 540 455 A1 | | 5/1993 | |
| EP | 0 562 897 A1 | | 9/1993 | |
| EP | 0 624 826 A1 | | 11/1994 | |
| EP | 0 893 223 A1 | | 1/1999 | |
| EP | 1527902 | * | 5/2005 | |
| EP | 1 720 079 A1 | | 11/2006 | |
| EP | 2 065 208 A1 | | 6/2009 | |
| EP | 2 159 055 A2 | | 3/2010 | |
| JP | 6-166170 A | | 6/1994 | |
| JP | 7-52597 A1 | | 2/1995 | |
| JP | 8-36352 A | | 2/1996 | |
| JP | 10-301276 A | | 11/1998 | |
| JP | 2003-001794 | | 1/2003 | |
| JP | 2004-059820 | * | 2/2004 | |
| JP | 2004-198774 | | 7/2004 | |
| JP | 2005-219370 | | 8/2005 | |
| JP | 2006-122848 A | | 5/2006 | |
| KR | 10-2002-0040902 | | 5/2002 | |
| WO | 90/01512 A1 | | 2/1990 | |
| WO | 94/18609 A1 | | 8/1994 | |
| WO | 98/46647 A1 | | 10/1998 | |
| WO | 00/30854 A1 | | 6/2000 | |
| WO | 00/53423 A1 | | 9/2000 | |
| WO | 01/30526 A1 | | 5/2001 | |
| WO | 2004/089813 A2 | | 10/2004 | |
| WO | 2005/049745 A1 | | 6/2005 | |
| WO | 2005/051675 A2 | | 6/2005 | |
| WO | 2006/032493 A2 | | 3/2006 | |
| WO | 2006/099312 A2 | | 9/2006 | |
| WO | 2007/040493 A1 | | 4/2007 | |
| WO | 2008/055807 A2 | | 5/2008 | |
| WO | 2008/061930 A1 | | 5/2008 | |
| WO | 2008/076785 A1 | | 6/2008 | |
| WO | 2009/056401 A1 | | 5/2009 | |
| WO | 2009/090126 | * | 7/2009 | |
| WO | 2010/049676 | * | 5/2010 | ............ B42D 15/10 |
| WO | 2010/069823 A1 | | 6/2010 | |
| WO | 2010/108837 A1 | | 9/2010 | |
| WO | 2011/020727 A1 | | 2/2011 | |
| WO | 2011/064162 A2 | | 6/2011 | |
| WO | 2012/041851 A1 | | 4/2012 | |
| WO | 2012/176126 A1 | | 12/2012 | |
| WO | 2013/186167 A2 | | 12/2013 | |

OTHER PUBLICATIONS

BASF, "Highlights! Radiation curing with resins and photoinitiators for industrial coatings and graphical arts" Laromer, Irgacure, Lucirin, Darocure, 44 pages (creation date Mar. 2011 of PDF downloaded).*
Extended European Search Report dated Jan. 24, 2012 in Patent Application No. 11170647.9.
International Search Report dated Nov. 15, 2012 in PCT/IB2012/053100 Filed Jun. 20, 2012.
Extended European Search Report for EP Patent Application No. 17169730.3, dated Aug. 21, 2017.

* cited by examiner

PRINTING DIFFRACTION GRATINGS ON PAPER AND BOARD

This application is a continuation of U.S. application Ser. No. 14/127,292 filed Dec. 18, 2013, which is a National Stage of PCT/IB2012/053100 filed Jun. 20, 2012, which claims benefit of 61/499,187 filed Jun. 21, 2011, all of which are incorporated herein by reference. This application also claims the benefit of EP 11170647.9 filed Jun. 21, 2011.

DESCRIPTION OF THE BACKGROUND

1. Field of the Invention

The present invention relates to a method for forming a surface relief microstructure, especially an optically variable image (an optically variable device) on a paper substrate, a paper product obtainable using the method and an apparatus for forming a surface relief microstructure on a paper substrate. Microstructures, such as holograms may be replicated rapidly and with accuracy on a paper substrate by using the method and the apparatus of the present invention.

2. Description of the Background

JP06122848 discloses a printing method, comprising intaglio printing, an ink is cured by irradiating with electron beam from the back side of the paper printed immediately after the intaglio printing, and using the ink without applying a releasing agent on the surface of the impression.

WO2000053423A1 relates to a method and apparatus for applying discrete area holograms or other optical devices directly onto documents or other substrates in a continuous process analogous to the operation of a printing press. The method comprises: (i) inserting a supply of untreated substrates into the vacuum chamber while at substantially atmospheric pressure; (ii) reducing pressure within the chamber to a level significantly less than atmospheric pressure; (iii) applying casting resin to discrete areas of the substrate; (iv) holding a micro-grove pattern of a transfer surface against a surface of the resin in the discrete substrate areas; (v) curing the resin while the transfer surface is being held against the resin; (vi) separating the transfer surface from the cured resin, thereby to retain the micro-groove pattern in the surface of the casting resin; (vii) applying a coating of optical material to the resin surface micro-grooves by means of a technique that is normally carried out in a vacuum, the coating being of a type that allows light to be reflected from the resin surface micro-groove pattern and which is substantially limited to the discrete areas of the substrate; (viii) adjusting the pressure within the chamber to a level of substantially atmospheric pressure; and (ix) removing the treated substrates from the chamber. The curing of the resin is done by electron beam radiation.

WO2005051675 is directed to a method for forming a holographic diffraction grating on a substrate comprising the steps of: a) applying a curable compound to at least a portion of the substrate; b) contacting at least a portion of the curable compound with diffraction grating forming means; c) curing the curable compound and d) depositing a metallic ink on at least a portion of the cured compound.

One disadvantage of the above method is that if the web material and the embossing shim are opaque to ultraviolet light, then the irradiation will not be effective from the web side or the embossing shim side.

EP0338378A1 relates to a method of treating sheet material in a continuous process, comprising the steps of: printing a visual pattern on at least one side of said sheet material in a first area thereof, thereafter applying a resin in liquid form to a second area of said at least one side of said sheet material, said second area being separate from said first area, holding against said resin a mold of a surface relief pattern in the form of a light diffraction pattern, thereby causing a surface of said resin to conform with said pattern, directing actinic radiation through said sheet material to said resin in a manner to harden said resin while being carried by said mold, separating said mold from the hardened resin, thereby to leave the hardened resin in place on said sheet material with the surface relief pattern contained therein, and coating substantially only the hardened resin in said discrete area with a reflective material in a manner to follow the surface relief pattern, whereby said sheet material is treated with both conventional printing and a light diffraction pattern in sequential steps of a continuous process.

According to EP0338378A1 the type of radiation that is used depends primarily upon the particular resin formulation and the nature of the sheet material. For sheet material of paper or other opaque substances, electron beam radiation is preferable. For optically transparent sheet material, either totally or partially, ultraviolet radiation can alternatively be used.

EP540455A1 describes a process for preparing printed sheets with optical effects, said sheets comprising a ply of plastics material worked as a lens through which motifs provided therebehind are viewed, characterized in that said sheets (2) are made from non-plastic absorbent material and in a first step they are printed, at least on one surface thereof, by any conventional system (3) with the pertinent motifs or illustrations; in a second step there is applied over the printed surface a resin (6), thermoplastic lacquer or other transparent material which wholly or partially impregnates the surface of the sheet (2), after which the engraving (7-8) which will produce the said optical effects is carried out in a third step on the impregnated area with heat and pressure.

According to FIG. 8 of EP540450A1, after being printed, the paper 2 is fed, while resting on the pertinent roll 11, under the device 5 which applies a resin or varnish 6 thereto. This material, which may be polymerized by ultraviolet rays, impregnates the surface of the paper, which is then fed, resin-coated, to a calender 18 which will apply thereto the engraving producing the optical effects, the resin-coated paper being wrapped on the periphery thereof and accompanying it in part of its rotation until being released from the calender to be fed thereafter to the shears 10 which will cut it into already engraved unit sheets 9.

For curing the calender has the component roll 7' and the peripheral die plate 8' transparent, the former being preferably of glass and the latter of polyester, with an ultraviolet ray source 20 being suitably mounted in the interior of the said roll 7' (FIG. 10). Said rays are projected by the source against the resin-coated surface of the paper 2 during its part rotation with the calender 18.

While according to EP540450A1 several ultraviolet ray sources may also be installed outside the calender 18 (FIG. 9), and acts on the paper 2 from behind, EP540450A1 fails to disclose details concerning the ultraviolet ray source, the UV varnish and photoinitiators.

EP1720079A1 describes a process of producing a coloured hologram, comprising the steps of: preparing a lacquer composition comprising a UV/EB-hardening acrylic resin and at least one pigment, said resin providing instant hardening upon irradiation; applying said lacquer composition to selected areas (6) of a flexible support (S) by means of a rotary printing machine; shaping the applied lacquer to impart it a relief that forms a hologram (8); and irradiating said shaped areas with a UV light/EB radiation (10).

The resin is cured by means of an UV lamp 10 positioned adjacent to master roller 7; if substrate S is paper or a similar non-transparent material, the UV lamp is located where the substrate leaves roller 7, on the side of the holograms 8, and is referred to as lamp 10a in FIG. 2 and in FIG. 4.

In WO94/18609 the curing of the radiation curable media is achieved by the use of a UV source that is located within the bore of a hollow quartz cylinder that is carrying the microstructure relief image to be molded. In one embodiment the relief image is formed in a polymer sleeve that has been placed or cast on the outer surface of the quartz cylinder. The polymer sleeve Is substantially transparent to the UV radiation that is used to cure the cast radiation curable resin. In a further embodiment the microstructure relief image is cast on the cylinder using UV curable resin system.

WO2006032493A2 suggests to use at least two UV sources; one located within the bore of the hollow cylinder and the other located beneath the cylinder and proximate to the back surface of the web as it passes around the hollow cylinder. In this arrangement the uncured resin when in contact with the surface relief microstructure of the cylinder is irradiated from above and below through the transparent substrate. It is possible with the present arrangement to utilize two additional UV sources outside of the hollow cylinder in the printing station. The benefit of additional UV irradiation at the contact point between the uncured resin and the surface relief microstructure on the hollow cylinder is that the resin may be cured faster and more thoroughly when in contact with the hollow cylinder surface relief ensuring high image quality and faster web speeds. This arrangement results in maximum UV irradiation in the contact region between the two nip rollers.

WO2008076785A1 discloses a method of making a decorated package comprising providing a material substrate having an inner and an outer surface, the outer surface to form the outer surface of a carton, coating up to about 100% of the outer surface with a radiation curable coating containing a particulate metal, curing the radiation curable coating containing the particulate metal coating by contacting the radiation curable coating containing the particulate metal coating with radiation, applying zero to one or more ink containing coatings to a substantial portion of the radiation curable coating containing the particulate metal, excluding an area that is to contain a hologram, curing the one or more ink containing coatings, applying a substantially transparent radiation curable coating to the surface of the one or more ink containing coatings, and contacting the substantially transparent radiation curable coating with at least one transparent shim containing a negative of a hologram image in an area not having one or more ink containing coatings, and at least partially curing the substantially transparent coating while the at least one shim is in contact with the substantially transparent coating to form the hologram image in the material substrate.

The primary system for UV curing is based on acrylate polymers and monomers and cured through free radical polymerization. Useful photoinitiators include benzoin derivatives, benzil ketals, acetophenone derivatives and benzophenone.

US2009056858A1 relates to a method for obtaining holograms and/or optical effects on a laminar material, said method comprising:

superimposing and pressing a die provided with an original micro-embossed pattern of a hologram, or corresponding to a configuration that can provide an optical effect, on a lacquer or varnish layer applied on a laminar substrate and curing the lacquer layer on said laminar substrates;

providing the die in the form of a laminar material on which the pattern is configured;

dynamically superimposing said lacquer layer applied to the laminar substrate to said die on a support roller, and dynamically pressing the lacquer layer applied to the laminar substrate against the die on said support roller by means of a pressure roller.

Curing comprises radiating the lacquer layer through the laminar substrate by means of an ultraviolet radiation lamp only in the event that the laminar substrate is transparent or translucent.

EP2159055A2 relates to a method which includes creating a predetermined pattern on an embossing substrate, applying an ink to a print substrate, applying the embossing substrate to the ink wherein the embossing substrate imprints the predetermined pattern into the ink, and curing, via a radiation source, the ink such that an imprint of the predetermined pattern is embossed in the ink.

It is emphasized in EP2159055A2 that when using a light based radiation source, such as UV curing source, the embossing substrate should be made from a material that is transparent to UV radiation. Reference is also made to WO00/30854, JP08036352A, JP07052597A, JP06166170A, WO01/30562 and WO2008061930.

The so-called transparent shims possess several disadvantages. Quartz is not robust enough and leads to a slow process. In addition, transparent shims (belts, or sleeves) can be only used a few times due to ageing under UV-light (polymer shims) and printing in register is very difficult.

In view of the above, there exists a need for systems and methods for printing microstructures (surface relief structures) on a paper substrate that fully incorporates surface relief technologies into mainstream printing applications such as secure documents, flexible and rigid packaging, labels, and printed forms.

There also exists a need for systems and methods for printing microstructures on a paper substrate that allows embossing or casting of the surface relief, and metallizing of the surface relief using a conventional printing system such as flexography, rotogravure, offset printing, silkscreen printing, digital printing, and ink jet printing.

Surprisingly, it has been found that a curable composition (varnish) applied on a paper substrate and embossed with a microstructure can be cured through paper when embossing is done.

SUMMARY OF THE INVENTION

Accordingly, the present invention relates to a method for forming a microstructure, especially an optically variable image (an optically variable device) on a paper substrate comprising the steps of:

A) applying a curable composition (varnish) to at least a portion of the frontside of the paper substrate;

B) contacting at least a portion of the curable composition with surface relief microstructure, especially optically variable image forming means;

C) curing the composition by using at least one UV lamp which is arranged on the backside of the paper substrate;

D) optionally depositing a layer of a transparent high refractive index material and/or a metallic layer on at least a portion of the cured composition, wherein the lamp having emission peak(s) in the UV-A range and preferably near VIS range and the curable composition comprises at least a photoinitiator which absorbs in the UV-A region and preferably in addition in the near VIS range.

DETAILED DESCRIPTION OF THE INVENTION

Figure 1:
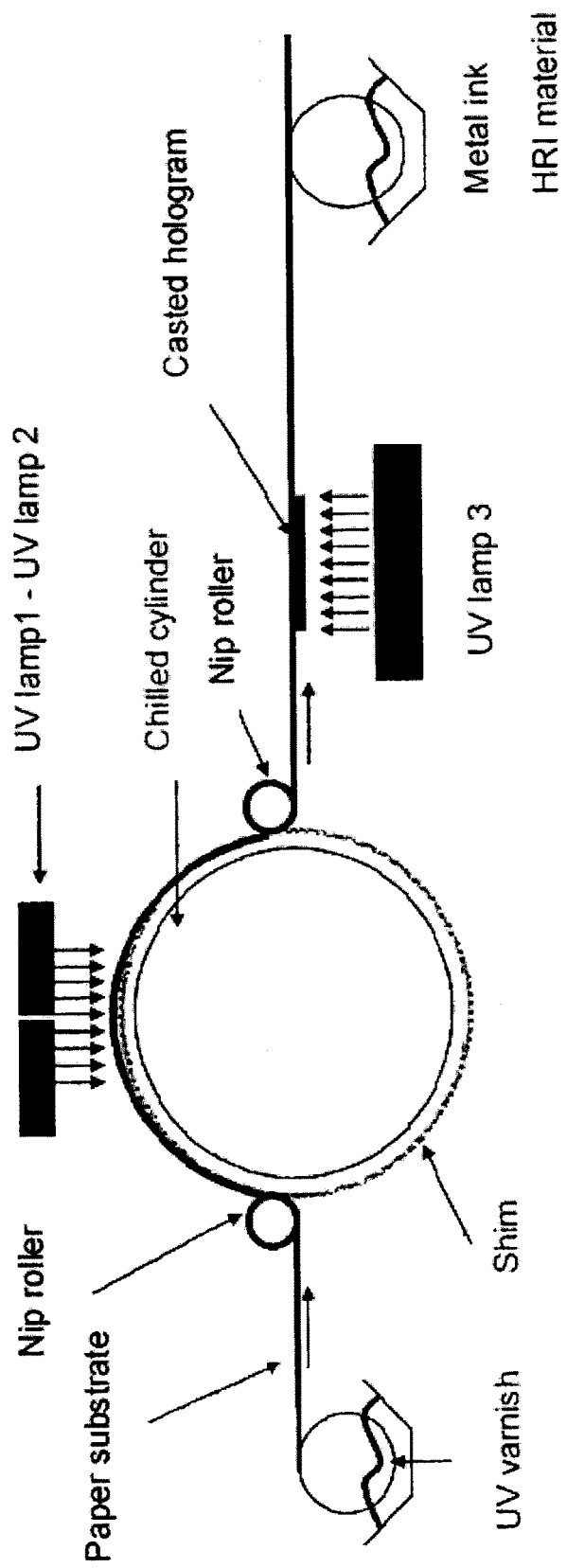
FIG. 1 shows an application apparatus for transferring surface relief microstructures from a shim to a substrate.

In a specific embodiment the invention relates to a method for forming a surface relief microstructure, especially an optically variable image (an optically variable device) on a paper substrate comprising the steps of:
A) applying a curable composition (varnish) to at least a portion of the frontside of the paper substrate wherein the curable composition comprises a photoinitiator which is selected from mono and bisacylphosphine oxide compounds, from alpha-amino ketone type compounds or from oxim ester compounds and mixtures thereof;
B) contacting at least a portion of the curable composition with surface relief microstructure, especially optically variable image forming means;
C) curing the composition by using at least one UV lamp which is arranged on the backside of the paper substrate;
D) optionally depositing a layer of a transparent high refractive index material and/or a metallic layer on at least a portion of the cured composition, wherein the lamp having emission peak(s) in the UV-A range and preferably near VIS range and the curable composition comprises at least a photoinitiator which absorbs in the UV-A region and preferably in addition in the near VIS range.

In addition, the present invention is directed to an apparatus for forming a surface relief microstructure on a paper substrate, which is coated with a curable composition (varnish) on at least part of its frontside comprising a printing press and surface relief microstructure forming means, wherein the microstructure forming means comprise
a) surface relief microstructure forming means, especially a shim which carries the micostructure to be casted into the curable composition, and
d) a lamp having emission peak(s) in the UV-A range and preferably near VIS range, which is arranged on the backside of the paper substrate, for curing the curable composition when the coated paper substrate is pressed against the shim.

A preferred (printing) apparatus according to the present invention comprises
a) mechanism for feeding a paper substrate through the apparatus,
b) a coating station comprising a source of a liquid UV curable composition and means for applying liquid composition from the source to a surface of the substrate,
d) an embossing/curing station comprising means for imprinting a (surface relief) microstructure into the surface of the applied composition on the substrate, and means for curing the resin having (surface relief) microstructures imprinted therein such that these micro-structures are retained in the cured resin, wherein the apparatus is arranged such that the composition is applied to the top surface of the substrate; that the means for imprinting the (surface relief) microstructure comprises is a nickel plate mounted on an opaque cylinder or metal cylinder having a (surface relief) microstructure and two nip rollers which contact the back surface of the substrate and which have an axis of rotation that is along the same axis as the axis of rotation of the cylinder and the means for curing the resin is a UV source located at the back surface of the paper substrate.

In one embodiment the apparatus of the present invention may be an off-line or stand alone unit or in an alternative, preferred embodiment this may be an in-line or integrated system with other further conventional printing, laminating, cutting, slitting and other converting stations as part of an integrated manufacturing process. In one embodiment the apparatus and processes of the present invention may be configured and used to provide partial holographic printing of a web based paper substrate. This may be achieved by partially printing the radiation curable lacquer as for example graphic elements onto the web based paper substrate and replicating the surface relief microstructure only in that areas where the radiation curable lacquer has been printed.

In a further aspect of the present invention the apparatus may further comprise a UV-post-curing unit with or without a heating unit, or just an IR-heating unit, or combined UV/IR, which may be especially recommended in order to support and speed up the curing of varnish systems. This post curing unit may be used when the coated substrate leaving the printing/curing unit although successfully imprinted is not full cured. The post-curing unit ensures that the coating is fully cured.

According to the present invention curing is done through the paper substrate and not through the shim (UV source located within the bore of a hollow quartz cylinder etc.).

The surface relief microstructure forming means is preferably a shim, which is selected from the group consisting of a nickel sleeve; a nickel plate; an etched, or laser imaged metallic drum, or other materials mounted on an opaque cylinder or metal cylinder containing the OVD image on the surface. The surface relief microstructure forming means may comprise means for cooling.

A UV-pre-curing unit may be located after the UV lacquer coating unit and before the embossing/curing unit. The pre-curing unit irradiates the radiation curable composition coated on the web substrate so that it is at least partially cured before it enters the embossing/curing station.

Surface relief microstructures, such as holograms may be replicated rapidly and with accuracy on a paper substrate by using the method and the apparatus of the present invention.

In the process of the present invention a photoinitiator or mixtures of two or more photoinitiators are employed.

In a preferred embodiment of the present invention the photoinitiator is selected from alpha-hydroxy ketone type compounds, alpha-alkoxy ketone type compounds, alpha-amino ketone type compounds, mono and bisacylphosphine oxide compounds, phenylglyoxylate compounds, oxim ester compounds and onium salt compounds (sulfonium salt compounds and iodoinium salt compounds) and mixtures thereof.

The, at present most preferred photoinitiators are mono and bisacylphosphine oxide compounds. Mono and bisacylphosphine oxide compounds can be used alone. Alternatively, a mixture of a mono and a bisacylphosphine oxide compound can be used, or the mono and bisacylphosphine oxide compounds can be used in admixture with other photoinitiators, such as, for example, the benzophenone type, alpha-amino ketone type, alpha-hydroxy ketone type, ketal compounds, phenylglyoxylate compounds, oxime ester compounds or onium salt compounds, especially a benzophenone compound, an alpha-hydroxy ketone, alpha-alkoxyketone, or alpha-aminoketone compound, very especially a benzophenone compound, an alpha-hydroxy ketone, or alpha-alkoxyketone compound. An alpha-aminoketone compound can be used, alone or in mixtures with other photoinitiators, if yellowing is not an issue.

Examples of photoinitiators are known to the person skilled in the art and for example published by Kurt Dietliker in "A compilation of photoinitiators commercially available for UV today", Sita Technology Textbook, Edinburgh, London, 2002.

Examples of suitable acylphosphine oxide compounds are of the formula XII

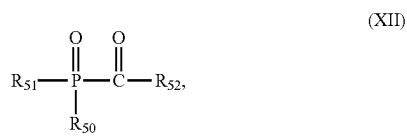

wherein $R_{50}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$;

or $R_{50}$ is unsubstituted $C_1$-$C_{20}$alkyl or is $C_1$-$C_{20}$alkyl which is substituted by one or more halogen, $C_1$-$C_{12}$alkoxy, $C_1$-$C_{12}$alkylthio, $NR_{53}R_{54}$ or by —(CO)—O—$C_1$-$C_{24}$alkyl;

$R_{51}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl,$_1$-$C_{12}$alkoxy, $C_1$-$C_{12}$alkylthio or by $NR_{53}R_{54}$; or $R_{51}$ is —(CO)$R'_{52}$; or $R_{51}$ is $C_1$-$C_{12}$alkyl which is unsubstituted or substituted by one or more halogen, $C_1$-$C_{12}$alkoxy, $C_1$-$C_{12}$alkylthio, or by $NR_{53}R_{54}$;

$R_{52}$ and $R'_{52}$ independently of each other are unsubstituted cyclohexyl, cyclopentyl, phenyl, naphthyl or biphenylyl, or are cyclohexyl, cyclopentyl, phenyl, naphthyl or biphenylyl substituted by one or more halogen, $C_1$-$C_4$alkyl or $C_1$-$C_4$alkoxy; or $R_{52}$ is a 5- or 6-membered heterocyclic ring comprising an S atom or N atom;

$R_{53}$ and $R_{54}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{53}$ and $R_{54}$ independently of one another are $C_2$-$C_{12}$-alkenyl, cyclopentyl, cyclohexyl, benzyl or phenyl;

Specific examples are bis(2,4,6-trimethylbenzoyl)-phenylphosphine oxide (Irgacure®819); 2,4,6-trimethylbenzoyl-diphenyl-phosphine oxide (Darocur®TPO); ethyl (2,4,6 trimethylbenzoyl phenyl)phosphinic acid ester; (2,4,6-trimethylbenzoyl)-2,4-dipentoxyphenylphosphine oxide, bis(2,6-dimethoxybenzoyl)-2,4,4-trimethylpentylphosphine oxide.

Interesting further are mixtures of the compounds of the formula XII with compounds of the formula XI as well as mixtures of different compounds of the formula XII.

Examples are mixtures of bis(2,6-dimethoxybenzoyl)-2,4,4-trimethylpentylphosphine oxide with 1-hydroxy-cyclohexyl-phenyl-ketone, of bis(2,4,6-trimethylbenzoyl)-phenylphosphine oxide with 2-hydroxy-2-methyl-1-phenyl-propan-1-one, of bis(2,4,6-trimethylbenzoyl) phenylphosphine oxide with ethyl (2,4,6 trimethylbenzoyl phenyl)phosphinic acid ester, etc.

Examples of suitable benzophenone compounds are compounds of the formula X:

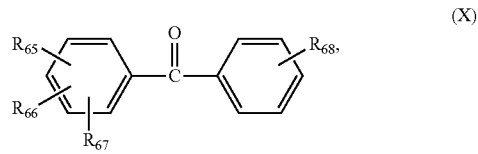

wherein $R_{65}$, $R_{66}$ and $R_{67}$ independently of one another are hydrogen, $C_1$-$C_4$alkyl, $C_1$-$C_4$-halogenalkyl, $C_1$-$C_4$alkoxy, Cl or $N(C_1$-$C_4$alkyl$)_2$;

$R_{68}$ is hydrogen, $C_1$-$C_4$alkyl, $C_1$-$C_4$halogenalkyl, phenyl, $N(C_1$-$C_4$alkyl$)_2$, $COOCH_3$,

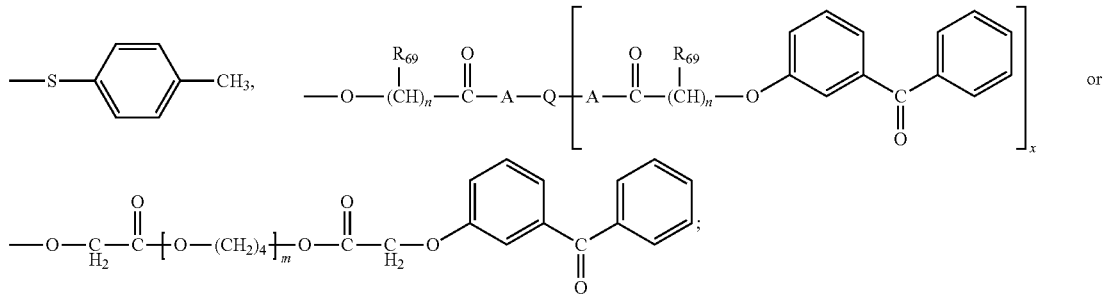

Q is a residue of a polyhydroxy compound having 2 to 6 hydroxy groups;

x is a number greater than 1 but no greater than the number of available hydroxyl groups in Q;

A is —[O(CH$_2$)$_b$CO]$_y$— or —[O(CH$_2$)$_b$CO]$_{(y-1)}$—[O(CHR$_{71}$CHR$_{70}$)$_a$]$_y$—;

$R_{69}$ is hydrogen, methyl or ethyl; and if N is greater than 1 the radicals $R_{69}$ may be the same as or different from each other;

a is a number from 1 to 2;

b is a number from 4 to 5;

y is a number from 1 to 10;

n is; and m is an integer 2-10.

Specific examples are Darocur®BP (=benzophenone), Esacure TZT® available from Lamberti, (a mixture of 2,4,6-trimethylbenzophenone and 4-methylbenzophenone), 4-phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)benzophenone, 3,3'-dimethyl-4-methoxybenzophenone, methyl-2-benzoylbenzoate, 4-(2-hydroxyethylthio)benzophenone, 4-(4-tolylthio)benzophenone, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)benzophenone, 4-benzoyl-N,N-dimethyl-N-[2-(1-oxo-2-propenyl)oxy]ethylbenzenemethanaminium chloride; [4-(2-hydroxy-ethylsulfanyl)-phenyl]-(4-isopropylphenyl)-methanone; biphenyl-[4-(2-hydroxy-ethylsulfanyl)-phenyl]-methanone; biphenyl-4-yl-phenyl-methanone; biphenyl-4-yl-p-tolyl-methanone; biphenyl-4-yl-m-tolyl-methanone; [4-(2-hydroxy-ethylsulfanyl)-phenyl]-p-tolyl-methanone; [4-(2-hydroxy-ethylsulfanyl)-phenyl]-(4-isopropyl-phenyl)-methanone; [4-(2-hydroxy-ethylsulfanyl)-phenyl]-(4-methoxy-phenyl)-methanone; 1-(4-benzoyl-phenoxy)-propan-2-one; [4-(2-hydroxy-ethylsulfanyl)-phenyl]-(4-phenoxy-phenyl)-methanone; 3-(4-benzoyl-phenyl)-2-dimethylamino-2-methyl-1-phenyl-propan-1-one; (4-chloro-phenyl)-(4-octylsulfanyl-phenyl)-methanone; (4-chloro-phenyl)-(4-dodecylsulfanyl-phenyl)-methanone; (4-bromo-phenyl)-(4-octylsulfanyl-phenyl)-methanone; (4-dodecylsulfanyl-phenyl)-(4-methoxy-phenyl)-methanone; (4-benzoyl-phenoxy)-acetic acid methyl ester; biphenyl-[4-(2-hydroxy-ethylsulfanyl)-phenyl]-methanone; 1-[4-(4-benzoylphenylsulfanyl)phenyl]-2-methyl-2-(4-methylphenylsulfonyl)propan-1-one (Esacure®1001 available from Lamberti).

Examples of suitable alpha-hydroxy ketone, alpha-alkoxyketone or alpha-aminoketone compounds are of the formula (XI)

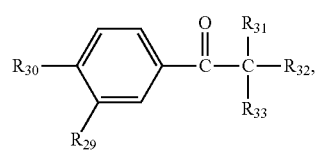

wherein $R_{29}$ is hydrogen or $C_1$-$C_{18}$alkoxy;

$R_{30}$ is hydrogen, $C_1$-$C_{18}$alkyl, $C_1$-$C_{12}$hydroxyalkyl, $C_1$-$C_{18}$alkoxy, $OCH_2CH_2$—$OR_{34}$, morpholino, S—$C_1$-$C_{18}$alkyl, a group —HC=$CH_2$, —$C(CH_3)$=$CH_2$,

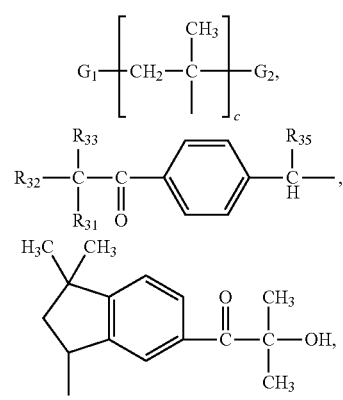

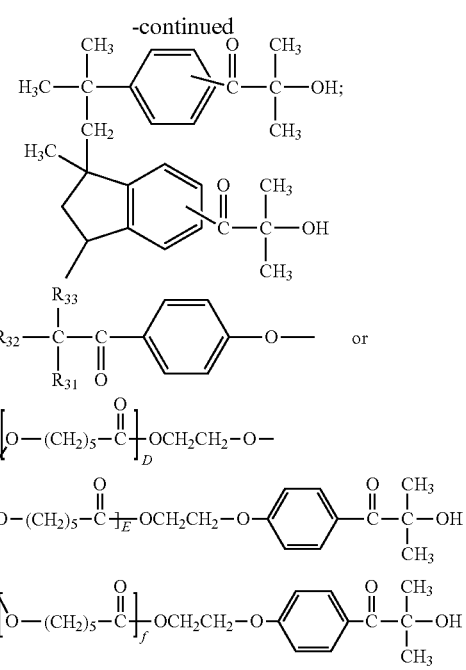

d, e and f are 1-3;
c is 2-10;
$G_1$ and $G_2$ independently of one another are end groups of the polymeric structure, preferably hydrogen or methyl;
$R_{34}$ is hydrogen,

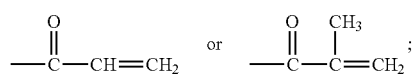

$R_{31}$ is hydroxy, $C_1$-$C_{16}$alkoxy, morpholino, dimethylamino or —$O(CH_2CH_2O)_g$—$C_1$-$C_{16}$alkyl;
g is 1-20;
$R_{32}$ and $R_{33}$ independently of one another are hydrogen, $C_1$-$C_6$alkyl, $C_1$-$C_{16}$alkoxy or —$O(CH_2CH_2O)_g$—$C_1$-$C_{16}$alkyl; or are unsubstituted phenyl or benzyl; or phenyl or benzyl substituted by $C_1$-$C_{12}$-alkyl; or $R_{32}$ and $R_{33}$ together with the carbon atom to which they are attached form a cyclohexyl ring;
$R_{35}$ is hydrogen, $OR_{36}$ or $NR_{37}R_{38}$;
$R_{36}$ is hydrogen, $C_1$-$C_{12}$alkyl which optionally is interrupted by one or more non-consecutive O-atoms and which uninterrupted or interrupted $C_1$-$C_{12}$alkyl optionally is substituted by one or more OH,
or $R_{36}$ is

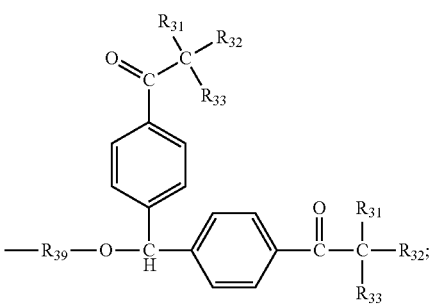

$R_{37}$ and $R_{38}$ independently of each other are hydrogen or $C_1$-$C_{12}$alkyl which is unsubstituted or is substituted by one or more OH;

$R_{39}$ is $C_1$-$C_{12}$alkylene which optionally is interrupted by one or more non-consecutive O, —(CO)—NH—$C_1$-$C_{12}$alkylene-NH—(CO)— or

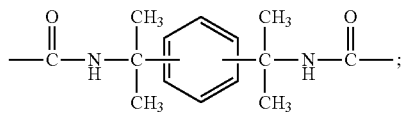

with the proviso that $R_{31}$, $R_{32}$ and $R_{33}$ not all together are $C_1$-$C_{16}$alkoxy or —O(CH$_2$CH$_2$O)$_g$—$C_1$-$C_{16}$alkyl.

Specific examples are 1-hydroxy-cyclohexyl-phenyl-ketone (Irgacure®184) or Irgacur® 500 (a mixture of Irgacure®184 with benzophenone), 2-methyl-1[4-(methylthio)phenyl]-2-morpholinopropan-1-one (Irgacure®907), 2-benzyl-2-dimethylamino-1-(4-morpholino-phenyl)-butan-1-one (Irgacure®369), 2-dimethylamino-2-(4-methyl-benzyl)-1-(4-morpholin-4-yl-phenyl)-butan-1-one (Irgacure®379), (3,4-dimethoxy-benzoyl)-1-benzyl-1-dimethylamino propane, 1-[4-(2-hydroxyethoxy)-phenyl]-2-hydroxy-2-methyl-1-propan-1-one (Irgacure®2959), 2,2-dimethoxy-1,2-diphenylethan-1-one (Irgacure®651), 2-hydroxy-2-methyl-1-phenyl-propan-1-one (Darocur®1173), 2-hydroxy-1-{4-[4-(2-hydroxy-2-methyl-propionyl)-benzyl]-phenyl}-2-methyl-propan-1-one (Irgacure®127), 2-hydroxy-1-{4-[4-(2-hydroxy-2-methyl-propionyl)-phenoxy]-phenyl}-2-methyl-propan-1-one, Esacure KIP provided by Lamberti, 2-hydroxy-1-{1-[4-(2-hydroxy-2-methyl-propionyl)-phenyl]-1,3,3-trimethyl-indan-5-yl}-2-methyl-propan-1-one.

Irgacure® and Darocur® products are available from BASF SE.

Examples of suitable phenylglyoxylate compounds are of the formula XIII

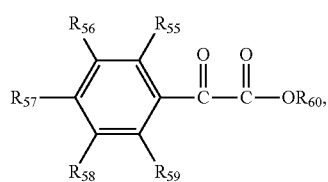

(XIII)

wherein
$R_{60}$ is hydrogen, $C_1$-$C_{12}$alkyl or

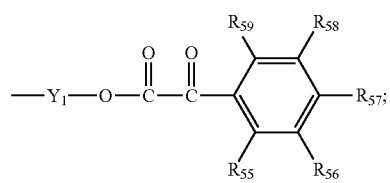

$R_{55}$, $R_{56}$, $R_{57}$, $R_{58}$ and $R_{59}$ independently of one another are hydrogen, unsubstituted $C_1$-$C_{12}$alkyl or $C_1$-$C_{12}$alkyl substituted by one or more OH, $C_1$-$C_4$alkoxy, phenyl, naphthyl, halogen or by CN; wherein the alkyl chain optionally is interrupted by one or more oxygen atoms; or $R_{55}$, $R_{56}$, $R_{57}$, $R_{58}$ and $R_{59}$ independently of one another are $C_1$-$C_4$alkoxy, $C_1$-$C_4$alkythio or NR$_{52}$R$_{53}$;

$R_{52}$ and $R_{53}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{52}$ and $R_{53}$ independently of one another are $C_2$-$C_{12}$-alkenyl, cyclopentyl, cyclohexyl, benzyl or phenyl; and $Y_1$ is $C_1$-$C_{12}$alkylene optionally interrupted by one or more oxygen atoms.

Specific examples of the compounds of the formula XIII are oxo-phenyl-acetic acid 2-[2-(2-oxo-2-phenyl-acetoxy)-ethoxy]-ethyl ester (Irgacure®754), methyl α-oxo benzeneacetate.

Examples of suitable oxime ester compounds are of the formula XIV

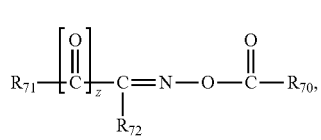

(XIV)

wherein
z is 0 or 1;
$R_{70}$ is hydrogen, $C_3$-$C_8$cycloalkyl; $C_1$-$C_{12}$alkyl which is unsubstituted or substituted by one or more halogen, phenyl or by CN; or $R_{70}$ is $C_2$-$C_5$alkenyl; phenyl which is unsubstituted or substituted by one or more $C_1$-$C_6$alkyl, halogen, CN, OR$_{73}$, SR$_{74}$ or by NR$_{75}$R$_{76}$; or $R_{70}$ is $C_1$-$C_8$alkoxy, benzyloxy; or phenoxy which is unsubstituted or substituted by one or more $C_1$-$C_6$alkyl or by halogen;

$R_{71}$ is phenyl, naphthyl, benzoyl or naphthoyl, each of which is substituted by one or more halogen, $C_1$-$C_{12}$alkyl, $C_3$-$C_8$cycloalkyl, benzyl, phenoxycarbonyl, $C_2$-$C_{12}$alkoxycarbonyl, OR$_{73}$, SR$_{74}$, SOR$_{74}$, SO$_2$R$_{74}$ or by NR$_{75}$R$_{76}$, wherein the substituents OR$_{73}$, SR$_{74}$ and NR$_{75}$R$_{76}$ optionally form 5- or 6-membered rings via the radicals R$_{73}$, R$_{74}$, R$_{75}$ and/or R$_{76}$ with further substituents on the phenyl or naphthyl ring; or each of which is substituted by phenyl or by phenyl which is substituted by one or more OR$_{73}$, SR$_{74}$ or by NR$_{75}$R$_{66}$;

or $R_{71}$ is thioxanthyl, or

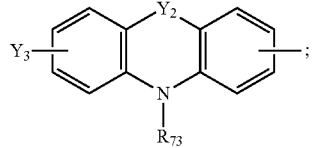

$R_{72}$ is hydrogen; unsubstituted $C_1$-$C_{20}$alkyl or $C_1$-$C_{20}$alkyl which is substituted by one or more halogen, OR$_{73}$, SR$_{74}$, $C_3$-$C_8$cycloalkyl or by phenyl; or is $C_3$-$C_8$cycloalkyl; or is phenyl which is unsubstituted or substituted by one or more $C_1$-$C_6$alkyl, phenyl, halogen, OR$_{73}$, SR$_{74}$ or by NR$_{75}$R$_{76}$; or is $C_2$-$C_{20}$alkanoyl or benzoyl which is unsubstituted or substituted by one or more $C_1$-$C_6$alkyl, phenyl, OR$_{73}$, SR$_{74}$ or by NR$_{75}$R$_{76}$; or is $C_2$-$C_{12}$alkoxycarbonyl, phenoxycarbonyl, CN, CONR$_{75}$R$_{76}$, NO$_2$, $C_1$-$C_4$haloalkyl, S(O)$_y$—$C_1$-$C_6$alkyl, or S(O)$_y$-phenyl,
y is 1 or 2;
$Y_2$ is a direct bond or no bond;
$Y_3$ is NO$_2$ or

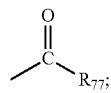

$R_{73}$ and $R_{74}$ independently of one another are hydrogen, $C_1$-$C_{20}$alkyl, $C_2$-$C_{12}$alkenyl, $C_3$-$C_8$cycloalkyl, $C_3$-$C_8$cycloalkyl which is interrupted by one or more, preferably 2, O, phenyl-$C_1$-$C_3$alkyl; or are $C_1$-$C_8$alkyl which is substituted by OH, SH, CN, $C_1$-$C_8$alkoxy, $C_1$-$C_8$alkanoyl, $C_3$-$C_8$cycloalkyl, by $C_3$-$C_8$cycloalkyl which is interrupted by one or more O, or which $C_1$-$C_8$alkyl is substituted by benzoyl which is unsubstituted or substituted by one or more $C_1$-$C_6$alkyl, halogen, OH, $C_1$-$C_4$alkoxy or by $C_1$-$C_4$alkylsulfanyl; or are phenyl or naphthyl, each of which is unsubstituted or substituted by halogen, $C_1$-$C_{12}$alkyl, $C_1$-$C_{12}$alkoxy, phenyl-$C_1$-$C_3$alkyloxy, phenoxy, $C_1$-$C_{12}$alkylsulfanyl, phenylsulfanyl, $N(C_1$-$C_{12}$alkyl$)_2$, diphenylamino or by

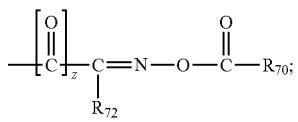

$R_{75}$ and $R_{76}$ independently of each other are hydrogen, $C_1$-$C_{20}$alkyl, $C_2$-$C_4$hydroxyalkyl, $C_2$-$C_{10}$alkoxyalkyl, $C_2$-$C_5$alkenyl, $C_3$-$C_8$cycloalkyl, phenyl-$C_1$-$C_3$alkyl, $C_1$-$C_8$alkanoyl, $C_3$-$C_{12}$alkenoyl, benzoyl; or are phenyl or naphthyl, each of which is unsubstituted or substituted by $C_1$-$C_{12}$alkyl, benzoyl or by $C_1$-$C_{12}$alkoxy; or $R_{75}$ and $R_{76}$ together are $C_2$-$C_6$alkylene optionally interrupted by O or $NR_{73}$ and optionally are substituted by hydroxyl, $C_1$-$C_4$alkoxy, $C_2$-$C_4$alkanoyloxy or by benzoyloxy;

$R_{77}$ is $C_1$-$C_{12}$alkyl, thienyl or phenyl which is unsubstituted or substituted by $C_1$-$C_{12}$alkyl, $OR_{73}$, morpholino or by N-carbazolyl.

Specific examples are 1,2-octanedione 1-[4-(phenylthio)phenyl]-2-(O-benzoyloxime) (Irgacure® OXE01), ethanone 1-[9-ethyl-6-(2-methylbenzoyl)-9H-carbazol-3-yl]-1-(O-acetyloxime) (Irgacure® OXE02), 9H-thioxanthene-2-carboxaldehyde 9-oxo-2-(O-acetyloxime), ethanone 1-[9-ethyl-6-(4morpholinobenzoyl)-9H-carbazol-3-yl]-1-(O-acetyloxime), ethanone 1-[9-ethyl-6-(2-methyl-4-(2-(1,3-dioxo-2-dimethyl-cyclopent-5-yl)ethoxy)-benzoyl)-9H-carbazol-3-yl]-1-(O-acetyloxime) (Adeka N-1919), ethanone 1-[9-ethyl-6-nitro-9H-carbazol-3-yl]-1-[2-methyl-4-(1-methyl-2-methoxy)ethoxy)phenyl]-1-(O-acetyloxime) (Adeka NCI831), etc.

It is also possible to add cationic photoinitiators, such as benzoyl peroxide (other suitable peroxides are described in U.S. Pat. No. 4,950,581, column 19, lines 17-25), or aromatic sulfonium, phosphonium or iodonium salts, such as are described, for example, in U.S. Pat. No. 4,950,581, column 18, line 60 to column 19, line 10.

Suitable sulfonium salt compounds are of formula XVa, XVb, XVc, XVd or XVe

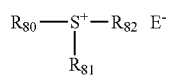

XVa

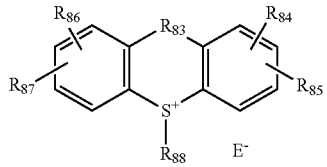

XVb

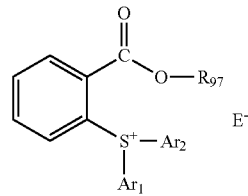

XVc

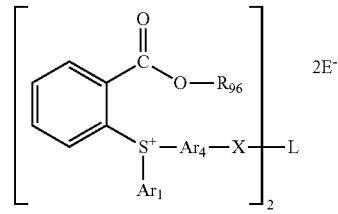

XVd

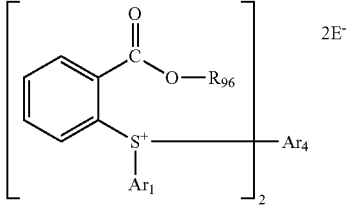

XVe wherein $R_{80}$, $R_{81}$ and $R_{82}$ are each independently of the others unsubstituted phenyl, or phenyl substituted by —S-phenyl,

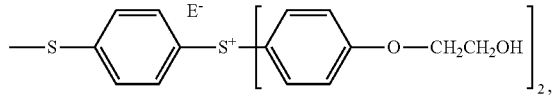

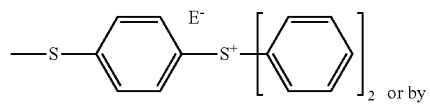

or by

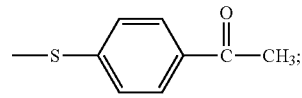

$R_{83}$ is a direct bond, S, O, $CH_2$, $(CH_2)_2$, CO or $NR_{89}$;

$R_{84}$, $R_{85}$, $R_{86}$ and $R_{87}$ independently of one another are hydrogen, $C_1$-$C_{20}$alkyl, $C_3$-$C_8$cycloalkyl, $C_1$-$C_{20}$alkoxy, $C_2$-$C_{20}$alkenyl, CN, OH, halogen, $C_1$-$C_6$alkylthio, phenyl, naphthyl, phenyl-$C_1$-$C_7$alkyl, naphthyl-$C_1$-$C_3$alkyl, phenoxy, naphthyloxy, phenyl-$C_1$-$C_7$alkyloxy, naphthyl-$C_1$-$C_3$alkyloxy, phenyl-$C_2$-$C_6$alkenyl, naphthyl-$C_2$-$C_4$alkenyl, S-phenyl, (CO)R$_{89}$, O(CO)R$_{89}$, (CO)OR$_{89}$, SO$_2$R$_{89}$ or OSO$_2$R$_{89}$;

R$_{88}$ is C$_1$-C$_{20}$alkyl, C$_1$-C$_{20}$hydroxyalkyl,

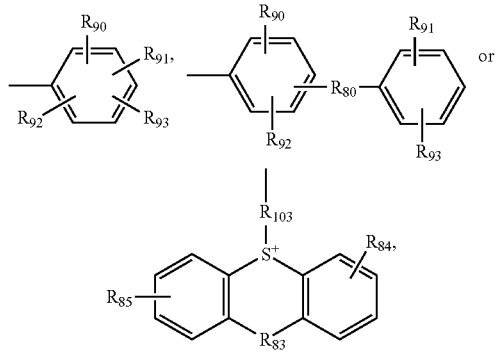

R$_{89}$ is hydrogen, C$_1$-C$_{12}$alkyl, C$_1$-C$_{12}$hydroxyalkyl, phenyl, naphthyl or biphenylyl;

R$_{90}$, R$_{91}$, R$_{92}$ and R$_{93}$ independently of one another have one of the meanings as given for R$_{84}$; or R$_{90}$ and R$_{91}$ are joined to form a fused ring system with the benzene rings to which they are attached;

R$_{95}$ is a direct bond, S, O or CH$_2$;

R$_{96}$ is hydrogen, C$_1$-C$_{20}$alkyl; C$_2$-C$_{20}$alkyl interrupted by one or more O; or is -L-M-R$_{98}$ or -L-R$_{98}$;

R$_{97}$ has one of the meanings as given for R$_{96}$ or is

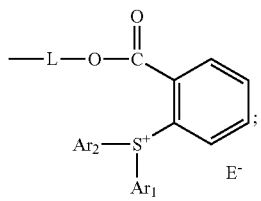

R$_{98}$ is a monovalent sensitizer or photoinitiator moiety;

Ar$_1$ and Ar$_2$ independently of one another are phenyl unsubstituted or substituted by C$_1$-C$_{20}$alkyl, halogen or OR$_{99}$;

or are unsubstituted naphthyl, anthryl, phenanthryl or biphenylyl;

or are naphthyl, anthryl, phenanthryl or biphenylyl substituted by C$_1$-C$_{20}$alkyl, OH or OR$_{99}$;

or are —Ar$_4$-A$_1$-Ar$_3$ or

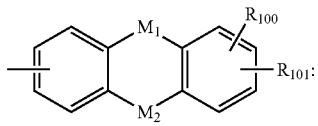

Ar$_3$ is unsubstituted phenyl, naphthyl, anthryl, phenanthryl or biphenylyl;

or is phenyl, naphthyl, anthryl, phenanthryl or biphenylyl substituted by C$_1$-C$_{20}$alkyl, OR$_{99}$ or benzoyl;

Ar$_4$ is phenylene, naphthylene, anthrylene or phenanthrylene;

A$_1$ is a direct bond, S, O or C$_1$-C$_{20}$alkylene;

X is CO, C(O)O, OC(O), O, S or NR$_{99}$;

L is a direct bond, S, O, C$_1$-C$_{20}$alkylene or C$_2$-C$_{20}$alkylene interrupted by one or more non-consecutive O;

R$_{99}$ is C$_1$-C$_{20}$alkyl or C$_1$-C$_{20}$hydroxyalkyl; or is C$_1$-C$_{20}$alkyl substituted by O(CO)R$_{102}$;

M$_1$ is S, CO or NR$_{100}$;

M$_2$ is a direct bond, CH$_2$, O or S;

R$_{100}$ and R$_{101}$ independently of one another are hydrogen, halogen, C$_1$-C$_8$alkyl, C$_1$-C$_8$alkoxy or phenyl;

R$_{102}$ is C$_1$-C$_{20}$alkyl;

R$_{103}$ is

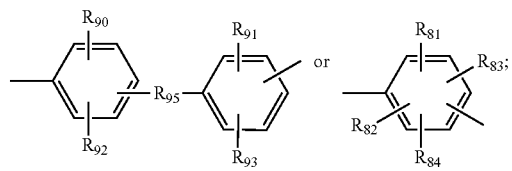

and

E is an anion, especially PF$_6$, SbF$_6$, AsF$_6$, BF$_4$, (C$_6$F$_5$)$_4$B, Cl, Br, HSO$_4$, CF$_3$—SO$_3$, F—SO$_3$,

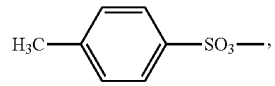

CH$_3$—SO$_3$, ClO$_4$, PO$_4$, NO$_3$, SO$_4$, CH$_3$—SO$_4$, or

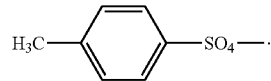

Specific examples of sulfonium salt compounds are for example Irgacure®270 (BASF SE); Cyracure® UVI-6990, Cyracure®UVI-6974 (Union Carbide), Degacure®KI 85 (Degussa), SP-55, SP-150, SP-170 (Asahi Denka), GE UVE 1014 (General Electric), SarCat® KI-85 (=triarylsulfonium hexafluorophosphate; Sartomer), SarCat® CD 1010 (=mixed triarylsulfonium hexafluoroantimonate; Sartomer); SarCat® CD 1011(=mixed triarylsulfonium hexafluorophosphate; Sartomer), Suitable iodonium salt compounds are of formula XVI

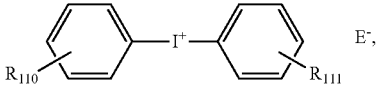

wherein

R$_{110}$ and R$_{111}$ are each independently of the other hydrogen, C$_1$-C$_{20}$alkyl, C$_1$-C$_{20}$alkoxy, OH—substituted C$_1$-C$_{20}$alkoxy, halogen, C$_2$-C$_{12}$alkenyl, C$_3$-C$_8$cycloalkyl, especially methyl, iso-propyl or isobutyl; and E is an anion, especially PF$_6$, SbF$_6$, AsF$_6$, BF$_4$, (C$_6$F$_5$)$_4$B, Cl, Br, HSO$_4$, CF$_3$—SO$_3$, F—SO$_3$,

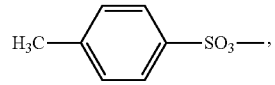

$CH_3$—$SO_3$, $ClO_4$, $PO_4$, $NO_3$, $SO_4$, $CH_3$—$SO_4$ or

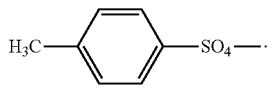

Specific examples of iodonium salt compounds are e.g. tolylcumyliodonium tetrakis(pentafluorophenyl)borate, 4-[(2-hydroxy-tetradecyloxy)phenyl]phenyliodonium hexafluoroantimonate or hexafluorophosphate, tolylcumyliodonium hexafluorophosphate, 4-isopropylphenyl-4'-methylphenyliodonium hexafluorophosphate, 4-isobutyl-phenyl-4'-methylphenyliodonium hexafluorophosphate (Irgacure® 250, BASF SE), 4-octyloxyphenyl-phenyliodonium hexafluorophosphate or hexafluoroantimonate, bis(dodecylphenyl)iodonium hexafluoroantimonate or hexafluorophosphate, bis(4-methylphenyl)iodonium hexafluorophosphate, bis(4-methoxyphenyl)iodonium hexafluorophosphate, 4-methylphenyl-4'-ethoxyphenyliodonium hexafluorophosphate, 4-methylphenyl-4'-dodecyl-phenyliodonium hexafluorophosphate, 4-methylphenyl-4'-phenoxyphenyliodonium hexafluorophosphate.

Of all the iodonium salts mentioned, compounds with other anions are, of course, also suitable. The preparation of iodonium salts is known to the person skilled in the art and described in the literature, for example U.S. Pat. Nos. 4,151,175, 3,862,333, 4,694,029, EP 562897, U.S. Pat. Nos. 4,399,071, 6,306,555, WO 98/46647 J. V. Crivello, "Photoinitiated Cationic Polymerization" in: UV Curing: Science and Technology, Editor S. P. Pappas, pages 24-77, Technology Marketing Corporation, Norwalk, Conn. 1980, ISBN No. 0-686-23773-0; J. V. Crivello, J. H. W. Lam, Macromolecules, 10, 1307 (1977) and J. V. Crivello, Ann. Rev. Mater. Sci. 1983, 13, pages 173-190 and J. V. Crivello, Journal of Polymer Science, Part A: Polymer Chemistry, Vol. 37, 4241-4254 (1999).

Halogen is fluorine, chlorine, bromine and iodine.

$C_1$-$C_{24}$alkyl ($C_1$-$C_{20}$alkyl, especially $C_1$-$C_{12}$alkyl) is typically linear or branched, where possible. Examples are methyl, ethyl, n-propyl, isopropyl, n-butyl, sec.-butyl, isobutyl, tert.-butyl, n-pentyl, 2-pentyl, 3-pentyl, 2,2-dimethyl-propyl, 1,1,3,3-tetramethylpentyl, n-hexyl, 1-methylhexyl, 1,1,3,3,5,5-hexamethylhexyl, n-heptyl, isoheptyl, 1,1,3,3-tetramethylbutyl, 1-methylheptyl, 3-methylheptyl, n-octyl, 1,1,3,3-tetramethylbutyl and 2-ethylhexyl, n-nonyl, decyl, undecyl, dodecyl, tridecyl, tetradecyl, pentadecyl, hexadecyl, heptadecyl, or octadecyl. $C_1$-$C_8$alkyl is typically methyl, ethyl, n-propyl, isopropyl, n-butyl, sec.-butyl, isobutyl, tert.-butyl, n-pentyl, 2-pentyl, 3-pentyl, 2,2-dimethyl-propyl, n-hexyl, n-heptyl, n-octyl, 1,1,3,3-tetramethylbutyl and 2-ethylhexyl. $C_1$-$C_4$alkyl is typically methyl, ethyl, n-propyl, isopropyl, n-butyl, sec.-butyl, isobutyl, tert.-butyl.

$C_2$-$C_{12}$alkenyl ($C_2$-$C_5$alkenyl) groups are straight-chain or branched alkenyl groups, such as e.g. vinyl, allyl, methallyl, isopropenyl, 2-butenyl, 3-butenyl, isobutenyl, n-penta-2,4-dienyl, 3-methyl-but-2-enyl, n-oct-2-enyl, or n-dodec-2-enyl.

$C_1$-$C_{12}$alkoxy groups ($C_1$-$C_8$alkoxy groups) are straight-chain or branched alkoxy groups, e.g. methoxy, ethoxy, n-propoxy, isopropoxy, n-butoxy, sec-butoxy, tert-butoxy, amyloxy, isoamyloxy or tert-amyloxy, heptyloxy, octyloxy, isooctyloxy, nonyloxy, decyloxy, undecyloxy and dodecyloxy.

$C_1$-$C_{12}$alkylthio groups ($C_1$-$C_8$ alkylthio groups) are straight-chain or branched alkylthio groups and have the same preferences as the akoxy groups, except that oxygen is exchanged against sulfur.

$C_1$-$C_{12}$alkylene is bivalent $C_1$-$C_{12}$alkyl, i.e. alkyl having two (instead of one) free valencies, e.g. trimethylene or tetramethylene.

A cycloalkyl group is typically $C_3$-$C_8$cycloalkyl, such as, for example, cyclopentyl, cyclohexyl, cycloheptyl, or cyclooctyl, which may be unsubstituted or substituted.

In several cases it is advantageous to in addition to the photoinitiator employ a sensitizer compound. Examples of suitable sensitizer compounds are disclosed in WO 06/008251, page 36, line 30 to page 38, line 8, the disclosure of which is hereby incorporated by reference. As sensitizer inter alia benzophenone compounds as described above can be employed.

The lamp used in the method and apparatus of the present invention has emission peak(s) in the UV-A range (400 nm to 320 nm) and short wavelength visible spectrum (400-450 nm). That is, the lamp has emission peak(s) in the range of from 320 to 450 nm.

UV radiation is generally classed as UV-A, UV-B, and UV-C as follows: UV-A: 400 nm to 320 nm UV-B: 320 nm to 290 nm UV-C: 290 nm to 100 nm.

Any ultraviolet light source may be employed as a radiation source, such as, a high or low pressure mercury lamp, a cold cathode tube, a black light, an ultraviolet LED, an ultraviolet laser, and a flash light.

Examples of lamps, which can be used in the process of the present invention are shown below:
Medium pressure mercury arcs are modified by the inclusion of metal halides in small proportions to vary the spectral output:
iron doped—spectral output shifted to 350-450 nm;
gallium doped—emits very little UV; emission in the violet and blue spectral regions (expected additional UV lines by doping a mercury arc with metal iodides at wavelength/nm: Gallium (Ga) 403, 417 and Iron (Fe) 358, 372, 374/5, 382, 386, 388); and
Focussed Reflected Diode Array (FRDA) systems (igb-tech GmbH), such as for example FRDA 202 having an emission peak around 400 nm. Multi-spectrum lamps can also be used.

Advantageously, a gallium, or iron doped medium pressure mercury arc is used in the method and apparatus of the present invention to produce more efficiently UV-A (315-400 nm) or UV-B (280-315 nm) and to provide better radiant efficiency ranges and higher curing.

Each irradiator consists of an aluminum housing containing a linear reflector with an elliptical (or, depending on application, parabolic) cross section. The reflector attached to the irradiator housing is made from a special aluminum which has a high degree of UV reflectivity and a resistance to tarnishing and corrosion.

The photoinitiator(s), or photoinitiator mixture and the lamp used must be optimised in dependence of the particular paper type in order to achieve optimal printing speed.

The forming of an optically variable image on the substrate may comprise depositing a curable composition on at least a portion of the substrate. The composition, generally a coating or lacquer may be deposited by means of gravure, flexographic, ink jet, offset and screen process printing as well as by coating processes. The curable lacquer is cured by ultraviolet (U.V.) light. UV curing lacquers can be obtained from BASF SE. The lacquers exposed to actinic radiations or electron beam used in the present invention are required to reach a solidified stage when they separate again from the imaging shim in order to keep the record in their upper layer of the sub-microscopic, holographic diffraction grating image or pattern (OVI). Particularly suitable for the lacquers compositions are chemistries used in the radiation curable industries in industrial coatings and graphic arts. Particularly suitable are compositions containing one or several photo-latent catalysts that will initiate polymerization of the exposed lacquer layer to UV radiation. Particularly suitable for fast curing and conversion to a solid state are compositions comprising one or several monomers and oligomers sensitive to free-radical polymerization, such as acrylates, methacrylates or monomers or/and oligomers, containing at least one ethylenically unsaturated group.

The unsaturated compounds may include one or more olefinic double bonds. They may be of low (monomeric) or high (oligomeric) molecular mass. Examples of monomers containing a double bond are alkyl, hydroxyalkyl or amino acrylates, or alkyl, hydroxyalkyl or amino methacrylates, for example methyl, ethyl, butyl, 2-ethylhexyl or 2-hydroxyethyl acrylate, isobornyl acrylate, methyl methacrylate or ethyl methacrylate. Silicone acrylates are also advantageous. Other examples are acrylonitrile, acrylamide, methacrylamide, N-substituted (meth)acrylamides, vinyl esters such as vinyl acetate, vinyl ethers such as isobutyl vinyl ether, styrene, alkyl- and halostyrenes, N-vinylpyrrolidone, vinyl chloride or vinylidene chloride.

Examples of monomers containing two or more double bonds are the diacrylates of ethylene glycol, propylene glycol, neopentyl glycol, hexamethylene glycol or of bisphenol A, and 4,4'-bis(2-acryl-oyloxyethoxy)diphenylpropane, trimethylolpropane triacrylate, pentaerythritol triacrylate or tetraacrylate, vinyl acrylate, divinylbenzene, divinyl succinate, diallyl phthalate, triallyl phosphate, triallyl isocyanurate or tris(2-acryloylethyl)isocyanurate. Examples of polyunsaturated compounds of relatively high molecular mass (oligomers) are acrylated epoxy resins, polyesters containing acrylate-, vinyl ether- or epoxy-groups, and also polyurethanes and polyethers. Further examples of unsaturated oligomers are unsaturated polyester resins, which are usually prepared from maleic acid, phthalic acid and one or more diols and have molecular weights of from about 500 to 3000. In addition it is also possible to employ vinyl ether monomers and oligomers, and also maleate-terminated oligomers with polyester, polyurethane, polyether, polyvinyl ether and epoxy main chains. Of particular suitability are combinations of oligomers which carry vinyl ether groups and of polymers as described in WO90/01512. However, copolymers of vinyl ether and maleic acid-functionalized monomers are also suitable. Unsaturated oligomers of this kind can also be referred to as prepolymers.

Particularly suitable examples are esters of ethylenically unsaturated carboxylic acids and polyols or polyepoxides, and polymers having ethylenically unsaturated groups in the chain or in side groups, for example unsaturated polyesters, polyamides and polyurethanes and copolymers thereof, polymers and copolymers containing (meth)acrylic groups in side chains, and also mixtures of one or more such polymers.

Examples of unsaturated carboxylic acids are acrylic acid, methacrylic acid, crotonic acid, itaconic acid, cinnamic acid, and unsaturated fatty acids such as linolenic acid or oleic acid. Acrylic and methacrylic acid are preferred.

Suitable polyols are aromatic and, in particular, aliphatic and cycloaliphatic polyols. Examples of aromatic polyols are hydroquinone, 4,4'-dihydroxydiphenyl, 2,2-di(4-hydroxyphenyl)propane, and also novolaks and resols.

Examples of polyepoxides are those based on the abovementioned polyols, especially the aromatic polyols, and epichlorohydrin. Other suitable polyols are polymers and copolymers containing hydroxyl groups in the polymer chain or in side groups, examples being polyvinyl alcohol and copolymers thereof or polyhydroxyalkyl methacrylates or copolymers thereof. Further polyols which are suitable are oligoesters having hydroxyl end groups.

Examples of aliphatic and cycloaliphatic polyols are alkylenediols having preferably 2 to 12 C atoms, such as ethylene glycol, 1,2- or 1,3-propanediol, 1,2-, 1,3- or 1,4-butanediol, pentanediol, hexanediol, octanediol, dodecanediol, diethylene glycol, triethylene glcyol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol and sorbitol.

The polyols may be partially or completely esterified with one carboxylic acid or with different unsaturated carboxylic acids, and in partial esters the free hydroxyl groups may be modified, for example etherified or esterified with other carboxylic acids.

Examples of esters are: trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tri pentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol tris-itaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetra methacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, or mixtures thereof.

Also suitable as polymerizable components are the amides of identical or different, unsaturated carboxylic acids with aromatic, cycloaliphatic and aliphatic polyamines having preferably 2 to 6, especially 2 to 4, amino groups. Examples of such polyamines are ethylenediamine, 1,2- or 1,3-propylenediamine, 1,2-, 1,3- or 1,4-butylenediamine, 1,5

-pentylenediamine, 1,6-hexylenediamine, octylenediamine, dodecylenediamine, 1,4-diaminocyclohexane, isophoronediamine, phenylenediamine, bisphenylenediamine, di-β-aminoethyl ether, diethylenetriamine, triethylenetetramine, di(β-aminoethoxy)- or di(β-aminopropoxy)ethane. Other suitable polyamines are polymers and copolymers, preferably with additional amino groups in the side chain, and oligoamides having amino end groups. Examples of such unsaturated amides are methylenebisacrylamide, 1,6-hexamethylenebisacrylamide, diethylenetriaminetrismethacrylamide, bis(methacrylamido-propoxy)ethane, β-methacrylamidoethyl methacrylate and N[(β-hydroxyethoxy) ethyl]acrylamide.

Suitable unsaturated polyesters and polyamides are derived, for example, from maleic acid and from diols or diamines. Some of the maleic acid can be replaced by other dicarboxylic acids. They can be used together with ethylenically unsaturated comonomers, for example styrene. The polyesters and polyamides may also be derived from dicarboxylic acids and from ethylenically unsaturated diols or diamines, especially from those with relatively long chains of, for example 6 to 20 C atoms. Examples of polyurethanes are those composed of saturated or unsaturated diisocyanates and of unsaturated or, respectively, saturated diols.

Polymers with (meth)acrylate groups in the side chain are likewise known. They may, for example, be reaction products of epoxy resins based on novolaks with (meth)acrylic acid, or may be homo- or copolymers of vinyl alcohol or hydroxyalkyl derivatives thereof which are esterified with (meth)acrylic acid, or may be homo- and copolymers of (meth)acrylates which are esterified with hydroxyalkyl (meth)acrylates.

Other suitable polymers with acrylate or methacrylate groups in the side chains are, for example, solvent soluble or alkaline soluble polyimide precursors, for example poly (amic acid ester) compounds, having the photopolymerizable side groups either attached to the backbone or to the ester groups in the molecule, i.e. according to EP624826. Such oligomers or polymers can be formulated with optionally reactive diluents, like polyfunctional (meth)acrylates in order to prepare highly sensitive polyimide precursor resists.

Examples of polymerizable component are also polymers or oligomers having at least two ethylenically unsaturated groups and at least one carboxyl function within the molecule structure, such as a resin obtained by the reaction of a saturated or unsaturated polybasic acid anhy-dride with a product of the reaction of an epoxy compound and an unsaturated monocarboxylic acid, for example, photosensitive compounds as described in JP 10-301276 and commercial products such as for example EB9696, UCB Chemicals; KAYARAD TCR1025, Nippon Kayaku Co., LTD., NK OLIGO EA-6340, EA-7440 from Shin-Nakamura Chemical Co., Ltd., or an addition product formed between a carboxyl group-containing resin and an unsaturated compound having an α,β-unsaturated double bond and an epoxy group (for example, ACA200M, Daicel Industries, Ltd.). Additional commercial products as examples of polymerizable component are ACA200, ACA210P, ACA230AA, ACA250, ACA300, ACA320 from Daicel Chemical Industries, Ltd.

The photopolymerizable compounds are used alone or in any desired mixtures. It is preferred to use mixtures of polyol (meth)acrylates. A preferred composition comprises at least one compound having at least one free carboxylic group.

As diluent, a mono- or multi-functional ethylenically unsaturated compound, or mixtures of several of said compounds, can be included in the above composition up to 70% by weight based on the solid portion of the composition.

The invention also provides compositions comprising as polymerizable component at least one ethylenically unsaturated photopolymerizable compound which is emulsified or dissolved in water, or organic solvents.

The unsaturated polymerizable components can also be used in admixture with non-photopolymerizable, film-forming components. These may, for example, be physically drying polymers or solutions thereof in organic solvents, for instance nitrocellulose or cellulose acetobutyrate. They may also, however, be chemically and/or thermally curable (heat-curable) resins, examples being polyisocyanates, polyepoxides and melamine resins, as well as polyimide precursors.

The use of heat-curable resins at the same time is important for use in systems known as hybrid systems, which in a first stage are photopolymerized and in a second stage are crosslinked by means of thermal aftertreatment.

A photoinitiator, or a mixture of photoinitiators is incorporated into the formulation to initiate the UV-curing process.

The curable composition (UV lacquer) comprises
(a) 1.0 to 20.0, especially 1.0 to 15.0, very especially 3.0 to 10.0% by weight of photoinitiator,
(b) 99.0 to 80.0, especially 99.0 to 85.0, very especially 97.0 to 90.0% by weight of a resin (polymerizable component(s)),
wherein the sum of components a) and b) adds up to 100%.

The curable composition may comprise various additives. Examples thereof include thermal inhibitors, light stabilisers, optical brighteners, fillers and pigments, as well as white and coloured pigments, dyes, antistatics, adhesion promoters, wetting agents, flow auxiliaries, lubricants, waxes, antiadhesive agents, dispersants, emulsifiers, anti-oxidants; fillers, e.g. talcum, gypsum, silicic acid, rutile, carbon black, zinc oxide, iron oxides; reaction accelerators, thickeners, matting agents, antifoams, leveling agents and other adjuvants customary, for example, in lacquer, ink and coating technology.

The UV lacquer may comprise an epoxy-acrylate from the CRAYNOR® Sartomer Europe range, or the LAROMER® range available from BASF SE (10 to 60%) and one or several acrylates (monofunctional and multifunctional), monomers which are available from Sartomer Europe, or BASF SE (20 to 90%) and one, or several photoinitiators (1 to 15%) such as Irgacure® 819 (BASF SE) and a levelling agent such as BYK®361 (0.01 to 1%) from BYK Chemie.

In a further embodiment of the present invention the ultraviolet coating can be coloured. That is the curable composition may comprise pigments and/or dyes. The pigments can be transparent organic color pigments or inorganic pigments.

Suitable colored pigments especially include organic pigments selected from the group consisting of azo, azomethine, methine, anthraquinone, phthalocyanine, perinone, perylene, diketopyrrolopyrrole, thioindigo, dioxazine iminoisoindoline, dioxazine, iminoisoindolinone, quinacridone, flavanthrone, indanthrone, anthrapyrimidine and quinophthalone pigments, or a mixture or solid solution thereof; especially a dioxazine, diketopyrrolopyrrole, quinacridone, phthalocyanine, indanthrone or iminoisoindolinone pigment, or a mixture or solid solution thereof.

Colored organic pigments of particular interest include C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, C.I. Pigment Green 36, the 2,9-dichloro-quinacridone in platelet form described in WO08/055807, or a mixture or solid solution thereof.

Plateletlike organic pigments, such as plateletlike quinacridones, phthalocyanine, fluororubine, dioxazines, red perylenes or diketopyrrolopyrroles can advantageously be used as component B.

Suitable colored pigments also include conventional inorganic pigments; especially those selected from the group consisting of metal oxides, antimony yellow, lead chromate, lead chromate sulfate, lead molybdate, ultramarine blue, cobalt blue, manganese blue, chrome oxide green, hydrated chrome oxide green, cobalt green and metal sulfides, such as cerium or cadmium sulfide, cadmium sulfoselenides, zinc ferrite, bismuth vanadate, Prussian blue, $Fe_3O_4$, carbon black and mixed metal oxides. Examples of commercially available inorganic pigments are BAYFERROX® 3920, BAYFERROX® 920, BAYFERROX® 645T, BAYFERROX® 303T, BAYFERROX® 110, BAYFERROX® 110 M, CHROMOXIDGRUEN GN, and CHROMOXIDGRUEN GN-M.

Examples of dyes, which can be used to color the curable composition, are selected from the group consisting of azo, azomethine, methine, anthraquinone, phthalocyanine, dioxazine, flavanthrone, indanthrone, anthrapyrimidine and metal complex dyes. Monoazo dyes, cobalt complex dyes, chrome complex dyes, anthraquinone dyes and copper phthalocyanine dyes are preferred.

According to an additional aspect of the invention nano- and micro-structures are capable of being printed using conventional printing methods, thus enabling printing at high speeds, at required widths, and in register with any conventional printing on the document or label being printed.

Optical microstructured images are composed of a series of structured surfaces (surface relief microstructures). These surfaces may have straight or curved profiles, with constant or random spacing, and may even vary from nanometers to millimeters in dimension. Patterns may be circular, linear, or have no uniform pattern. Embossed patterns may comprise microstructures having dimensions in the range from about 0.01 microns to about 100 microns. Light interference patterns based on microstructures having dimensions in the range from about 0.1 microns to about 10 microns, preferably about 0.1 microns to about 1 microns. For example a Fresnel lens has a microstructured surface on one side and a planar surface on the other. The microstructured surface consists of a series of grooves with changing slope angles as the distance from the optical axis increases. The draft facets located between the slope facets usually do not affect the optical performance of the Fresnel lens.

The optical interference pattern can take various conventional forms including diffraction patterns such as diffraction gratings, refraction patterns, holographic patterns such as two-dimensional and three-dimensional holographic images, corner cube reflectors, Kinegram® devices (i.e., holograms with changing imagery as the angel of view is changed), Pixelgram® devices (i.e., a hologram with multiple holographic pixels arranged in a spatial orientation that generates one holographic image), zero order diffraction patterns, moire patterns, or other light interference patterns based on microstructures having dimensions in the range from about 0.1 microns to about 10 microns, preferably about 0.1 microns to about 1 microns, and various combinations of the above such as hologram/grating images, or other like interference patterns.

Such structures include, but are not limited to: (1) electron beam generated holograms; (2) dot matrix holograms; (3) computer generated holograms; (4) optically variable devices (OVDs); (5) diffractive optical variable devices (DOVIDs); (6) lenses; (7) lenticular lenses; (8) non-reflective structures; (9) light management structures; (10) deep structures (e.g., structures that diffract only one wavelength at a very wide viewing angle, such as found in some butterflies and other insects); (11) radio frequency identification (RFID) antennas; (12) embossable computer chips; (13) retroreflective structures; (14) metallic-looking structures; ROVIDs (reflective optical variable devices).

The optically variable device (OVD) is, for example, a diffractive optical variable image (DOVI). The term "diffractive optical variable image" as used herein may refer to any type of holograms including, for example, but not limited to a multiple plane hologram (e.g., 2-dimensional hologram, 3-dimensional hologram, etc.), a stereogram, and a grating image (e.g., dot-matrix, pixelgram, exelgram, kinegram, etc.).

The method and apparatus of the present invention will now be described, by way of example only, with reference to the accompanying examples and figures, in which:

FIG. 1 shows an application apparatus for transferring surface relief microstructures from a shim to a substrate.

Figure 2:
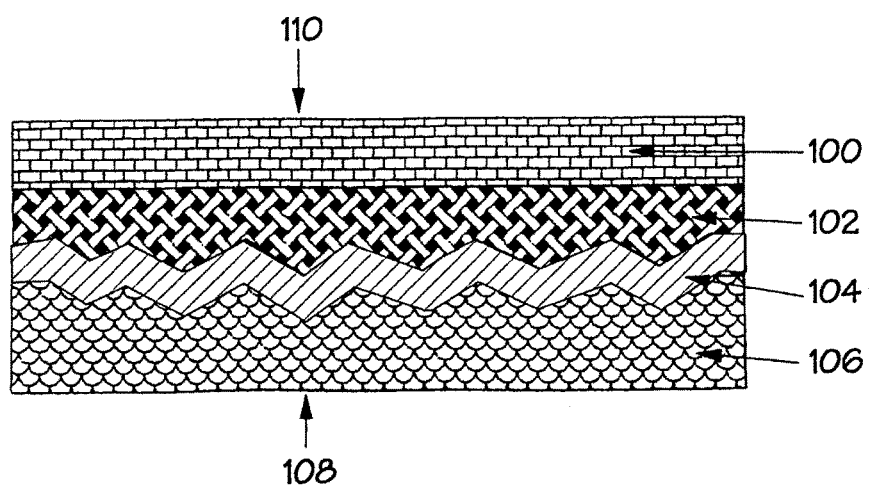
FIG. 2 is a cross-sectional schematic view of one embodiment in accordance with the present invention.

FIG. 2 is a cross-sectional schematic view of one embodiment in accordance with the present invention.

Referring to the FIG. 1 a roll of paper substrate is unwound and passed through a coating station that applies an UV varnish to the top surface of the paper substrate. This coated substrate then passes to the printing/curing station, which comprises a chilled cylinder upon which is located a layer comprising a surface relief microstructure (nickel plate). The coated substrate under tension is guided by nip rollers around the cylinder and passes through two nip sections provided by the nip rollers, which are in contact with the back surface of the paper substrate. The cylinder and nip rollers are in indirect contact with each other (the substrate is located between them). As the coated substrate passes through the printing/curing station the UV varnish is imprinted with the surface relief microstructure and simultaneously cured by the action of the UV radiation, which passes through the paper substrate to cure the UV varnish on the substrate thus ensuring that the surface relief microstructure is retained in the surface of the cured varnish layer. UV lamp 1 is arranged on the backside of the coated paper substrate. It is also possible to use 2, or more UV lamps (UV lamp 2) for curing of the UV varnish.

If necessary, the UV varnish on the substrate may be completely cured by irradiation with an additional UV lamp 3, which is arranged on the coated side of the paper substrate. Thereafter a metal layer, or a layer of a high refractive index material may be applied on top of the embossed and cured UV varnish layer.

The layout of this apparatus is compact and highly adaptable for the inclusion of other stations and process features.

In a preferred embodiment, the method of the present invention includes irradiating the varnish layer on the substrate with a UV source rich in UVA, a gallium-doped lamp in one embodiment with a power level of up to 200 W/cm. Other embodiments may use an iron-doped lamp or a different lamp high in UVA and possibly high in both UVA and UVB. Using an UV source rich in UVA has been found to have the advantage of fast curing speed.

In a further aspect of the present invention the apparatus may further comprise a UV-post-curing unit with or without a heating unit, or just an IR-heating unit, or combined UV/IR, which may be especially recommended in order to support and speed up the curing of varnish systems. This post curing unit may be used when the coated substrate leaving the printing/curing unit although successfully imprinted is not full cured. The post-curing unit ensures that the coating is fully cured.

The substrate may be in the form of one or more sheets or a web. The substrate is preferably an opaque substrate that enables UV light transmission with a thickness of 12 micron up to 300 micron, such as, for example, paper. The paper substrate is selected from regular paper, banknote paper, synthetic paper, or a polymer banknote. Regular paper is made from wood pulp. Banknote paper is usually made from cotton. Synthetic paper contains a large part of synthetic resin derived from petroleum as its primary material. There are three major sub-classes of synthetic paper:
- film synthetic paper like Teslin® (PPG Industries; a microporous, highly filled, single layer, polyolefin synthetic material), or Yupo® (Covert-All, Inc.; an opaque white, multi-layered biaxially oriented polypropylene (BOPP) product);
- fibre synthetic paper (polymer fibres instead of wood fibres); and
- film laminated synthetic paper: paper/film/paper, such as, for example, Durasafe® (Land-quart); film/paper/film, such as, for example Hybrid banknote substrate (Giesecke & Devrient; combination of protective polyester film around a cotton fiber core).

The term paper substrate also comprises polymer banknotes, such as, for example, Guardian (Securency; biaxially-oriented polypropylene (BOPP) core with white basecoat applied by gravure printing).

In a specific embodiment of the invention the paper or board has been treated with a cationic polymer on the frontside before applying a curable composition (varnish) to at least a portion of the frontside of the paper substrate.

Treating in the context of the instant invention comprises all suitable means for applying the polymer solution to the surface of the paper substrate; in particular printing or coating.

The cationic polymers utilized in the present invention for treating the paper include repeating amine units that are capable of forming cationic amine salts. The amine group-containing cationic polymer may be a homopolymer or a copolymer. The homopolymer or copolymer may be either in the base form, or partially, or wholly, in the cationic amine salt form. Such cationic polymers are, for example, described in US 2008/0318150 on page 3 to 4.

Preferably the cationic polymer is a polyvinylamine, which is preferably hydrolysed to at least 90%.

Polyvinylamine or partially or fully hydrolysed polyvinylformamide are obtainable by polymerisation of N-vinylformamide and subsequent hydrolysis and elimination of the formyl groups to obtain amine groups. The degree of hydrolysis may range from 1% to 100%, preferably≥50% and more preferably≥90%. Particularly preferred is a fully hydrolysed poylvinylformamide.

The preparation of N-vinylformamide polymers and the subsequent hydrolysis is, for example, extensively described in U.S. Pat. No. 6,132,558, col. 2, line 36 to col. 5, line 25. Polyvinylamine and partially or fully hydrolysed polyvinylformamide are commercially available under the trade names Catiofast® and Polymin® from BASF SE.

For example the average molecular weight of these polymers $M_w$ is from 20 000 to 2 000 000 g/mol, for instance from 50 000 to 1 000 000, in particular from 100 000 to 500 000 g/mol.

For example the polyvinylamine contains 0.1 to 22 milliequivalent (meq), for instance 5 bis 18 meq cationic groups per gram polyvinylamine. The polyvinylamine polymers are typically in the form of a dispersion or solution, for example with a solid content from 10% to 40%, for instance from 15% to 30% and preferably from 20% to 25%. They are usually applied to the paper or board from such solutions or dispersions.

The amount applied of the above mentioned polymer solution is, for example 2 to 20 g, for instance 2 to 15 g and preferably 4 to 12 g per $m^2$ paper substrate. The polymer solution is subsequently dried by means of an infra red dryer and/or a hot air dryer.

It is also possible to apply together with the cationic polymer further natural polymers such as starch, in particular amylopectine. The amount admixed to the cationic polymer is typically from 5% to 50% based on the weight of the cationic polymer.

The forming of an optically variable image on the substrate may comprise depositing a curable composition (varnish) on at least a portion of the substrate. The composition, generally a coating or lacquer may be deposited by means of offset, gravure, flexographic, ink jet and screen process printing, or other coating methods, but is preferably deposited by means of gravure or flexographic printing. The curable lacquer is cured by ultraviolet (U.V.) light. The lacquers exposed to UV radiation used in the present invention are required to reach a solidified stage when they separate again from the imaging shim in order to keep the record in their upper layer of the sub-microscopic, holographic diffraction grating image or pattern (OVI).

Diffraction requires that the medium the grating is made of and the media bordering the grating have a difference in optical index. The larger this difference is, the brighter the diffraction will appear. To create highest diffraction, full reflective materials such as metals like aluminum, copper or gold, are thin film coated onto the surface of the grating. Alternately, the grating is coated with a thin film of transparent material having a high refractive index (HRI).

The metallic layer, or the layer of the transparent high reflective index material can be deposited by physical vapour deposition, but are preferably formed by depositing a metallic ink, or an ink of a transparent high reflective index material on the cured composition.

The metallic ink comprise preferably any one or more selected from the group comprising aluminium, stainless steel, nichrome, gold, silver, platinum and copper.

A paper substrate is printed with an ultra violet curable composition on its lower surface. An optically variable image (OVI) is cast into the surface of the composition with a shim having the OVI thereon. The OVI is imparted into the composition and instantly cured via an UV lamp disposed at the upper surface of the paper substrate at normal processing speeds. The OVI is a facsimile of the image on the shim. Metallic ink is printed over the OVI and causes the optically variable device or other lens or engraved structure to become light reflective. Further colours can be subsequently conventionally printed in-line at normal printing process speeds.

The shim is selected from the group consisting of a nickel sleeve; a nickel plate; an etched, or laser imaged metallic drum, or other materials mounted on an opaque cylinder or metal cylinder containing the OVD image on the surface.

Most preferred, the shim is a nickel plate mounted on an opaque cylinder or metal cylinder and containing the OVD image on the surface (nickel shim).

In an alternative embodiment a paper substrate is printed conventionally with a number of coloured inks. Using, for example, a Cerutti R950 printer (available from Cerrutti UK Long Hanborough Oxon.). The substrate is then printed with an ultra violet curable composition on the surface of the printed paper substrate. An OVI is cast into the surface of the composition with a shim, especially a nickel shim having the OVI thereon, the OVI is imparted into the composition and instantly cured via a UV lamp at normal processing speeds, becoming a facsimile of the image disposed on the nickel shim. A metallic ink is printed over the OVI and causes the optically variable device (OVD) to become light reflective.

In an alternative embodiment, an UV primer (varnish), which is applied to the substrate and when exposed to the UV light source is pre-cured. The pre-curing is not complete but stable enough to have received the diffraction pattern or array of sub-microscopic images. The pre-cured coating is then exposed to an additional UV light source and totally cured. In said embodiment alternatively to the UV primers of the free radical type cationic systems can be used.

Cationic epoxy based chemistry may offer additional benefits, such as, for example, low shrinkage on curing, good flexibility, low odour in the formulation and cured film. Low toxicity and skin irritation, no oxygen inhibition, improved gas barrier properties, good electrical properties, high chemical and solvent resistance and lower viscosity of the resins could aid printability.

A conventional printing press rotogravure, UV flexographic or similar can have an extra station added, this being an embossing station. The substrate is first embossed (first station), then printed using a specifically formulated metallic ink to produce the metallised effect. Conventional printing can also be carried out on the same press. As the metallic ink is formulated like a normal ink, conventional printing methods can be utilised. The printing of the metallic ink can be anywhere in the line; it does not have to come directly after embossing. If an encoder for example an indexing machine which marks the sheet or web so that the mark can be recognised by the print operator is placed in the embossing area and the embossing head has specified areas of imagery, then register to print can be achieved. Printing of the metallic ink can be solid, semi translucent etc, with the resulting effect being that in one pass of the printing press metallising, semi-metallising, de-metallising and normal printing of colours in or not in register can be achieved. The specifically formulated metallic ink can be printed on either side of the film, however generally this will be carried out on the embossed side, to encapsulate the holographic embossed image/pattern so that it remains intact, should it come into contact with any filling agents such as liquids, grease, solvents, lacquers, inks or any other surface contaminants or foreign bodies of any kind.

Alternately, the OVD is coated with a thin film of transparent material having a high refractive index (HRI). Examples are transparent polymers having greater refractive index than the hologram forming layer ($\eta$=ca. 1.50), such as, for example, PEI (polyetherimide; $\eta$=1.65-1.77) PEEK (polyetheretherketone; $\eta$=1.66-1.67), and polysulfones ($\eta$=1.63-1.65). In addition, extrinsic high refractive index polymers result of the incorporation of high refractive index materials, especially nanoparticles into conventional polymers or intrinsic high refractive index polymers.

The transparent high reflective index material is preferably selected from nanoparticles of polymethylmethacrylat (PMMA), ZnS, ZnO, Si, $Sb_2S_3$, $Fe_2O_3$, PbO, PbS, ZnSe, CdS, $TiO_2$, $PbCl_2$, $CeO_2$, $Ta_2O_5$, ZnO, CdO, and $Nd_2O_3$, wherein nanoparticles of PMMA, nanoparticles of $TiO_2$ and platelets of ZnS are preferred. Substrates coated with a transparent HRI coating are often used for security applications such as identification or access cards, where it is desired that information positioned behind the hologram remains visible to the unaided eye.

The OVD of the present invention may either comprise a metallic layer, or layer of the transparent high reflective index material on the cured embossed varnish or a layer of the transparent high reflective index material on the cured embossed varnish and a metallic layer on the layer of the transparent high reflective index material.

The metallic ink may be applied to the substrate by means of conventional printing press such as gravure, rotogravure, flexographic, lithographic, offset, letterpress intaglio and/or screen process, or other printing process. The substrate may then be rewound for subsequent off line printing at a later stage or alternatively, the substrate may be pre-printed in line or off line or subsequently printed in line.

The metal-based ink may comprise metal pigment particles, a binder and optionally a colorant, such as a pigment, or dye, wherein pigments and dyes, which can be used for coloring the UV varnish, can also be used for colouring the metal-based ink.

The metal pigment particles may comprise any suitable metal. Nonlimiting examples of suitable metallic materials include aluminum, silver, copper, gold, platinum, tin, titanium, palladium, nickel, cobalt, rhodium, niobium, stainless steel, nichrome, chromium, and compounds, combinations or alloys thereof. The particles may comprise any one or more selected from the group comprising aluminium, gold, silver, platinum and copper. Preferably, the particles comprise aluminium, silver and/or copper flakes.

In a preferred embodiment of the present invention, platelet shaped transition metal particles having a longest dimension of edge length of from 15 nm to 1000 nm, preferably from 15 nm to 600 nm and particularly from 20 nm to 500 nm, and a thickness of from 2 nm to 100 nm, preferably from 2 to 40 nm and particularly from 4 to 30 nm are used. The production of the shaped transition metal particles is, for example, described in US2008/0295646, WO2004/089813, WO2006/099312, C. Xue et al., Adv. Mater. 19, 2007, 4071, WO2009056401 and WO2010/108837. The use of the platelet shaped transition metal particles for producing holograms is described in WO2011/064162. The inks comprise a total content of shaped transition metal particles of from 0.1 to 90% by weight, preferably 0.1-70% by weight based on the total weight of the ink. Preferably, the binder comprises 50% nitrocellulose in conjunction with any below mentioned resin. The ink may additionally comprise a solvent. The solvent may be ester/alcohol blends and preferably normal propyl acetate and ethanol. More preferably, the ester/alcohol blend is in a ratio of between 10:1 and 40:1, even more preferably 20:1 to 30:1. The solvent used in the metallic ink may comprise any one or more of an ester, such as n-propyl acetate, iso-propyl acetate, ethyl acetate, butyl acetate; an alcohol, such as ethyl alcohol, industrial methylated spirits, isopropyl alcohol or normal propyl alcohol; a ketone, such as methyl ethyl ketone or acetone; an aromatic hydrocarbon, such as toluene, and water.

The platelet shaped (transition) metal particles may be used in combination with spherical (transition) metal particles. Alternatively, spherical (transition) metal particles having a diameter of ≤40 nm, especially ≤20 nm may be used alone.

In another preferred embodiment the metal pigment is a metal pigment produced by physical vapor deposition (PVD metal pigment). The operating range of vacuum deposition may be in the range of 5 to 50 nm, the preferred thickness of the metal particles is in the range of 8 to 21 nm. Preferably, the thickness of the metal pigment particles is less than 50 nm. More preferably, the thickness of metal pigment particle is less than 35 nm. More preferably still, the thickness of pigment particle is less than 20 nm. Even more preferably still, the thickness of pigment particle is in the range 5-18 nm.

The optical density may be in the range of 0.046 to 1, especially 0.09 to 0.8 as measured on the McBeth densitomiter. In another embodiment the range is 0.2 to 0.8, especially 0.5 to 0.8 as measured on the McBeth densitomiter.

The metal layer may comprise aluminium, stainless steel, nichrome, gold, silver, platinum or any other metal which can be vaporised and deposited by vacuum deposition or applied by sputtering or electron beam deposition. Preferably, the metal layer comprises aluminium.

The average particle diameter may be in the range of 8 to 15 microns, the preferred range being 9 to 10 microns diameter as measured by a Coulter LS130 l.a.s.e.r. diffraction granulometer.

In order that the sub-microscopic or holographic diffraction grating pattern or image (OVI) is clearly visible on the first surface of a paper substrate, preferably, the aluminium or other flakes are printed in such a way as to align themselves with the contours of the sub-microscopic, holographic or other diffraction grating pattern or image surface wave length such that the flakes conform to and follow the contours of the diffraction grating. To accomplish this alignment of flakes to the contours of the diffraction grating wave length i.e. the distance between peak and peak or trough and trough of the sub-microscopic contour, the specifically formulated metallic ink preferably has a very low binder content, high pigment to binder ratio and very thin aluminium flake, preferably in the range of 9 to 10 microns, consistent to maintain good adhesion of the ink to the surface to the sub-microscopic or holographic diffraction pattern or image. The binder may comprise any one or more selected from the group comprising nitro cellulose, vinyl chloride, vinyl acetate copolymers, vinyl, acrylic, urethane, polythyleneterephthalate, terpene phenol, polyolefin, silicone, cellulose, polyamide, rosin ester resins. The preferred binder is 50% nitrocellulose (ID nitrocellulose DHL120/170 and nitrocellulose DLX30/50 supplied by Nobel Industries) 50% polyurethane (ID Neorez U335 supplied by Avecia). The solvents may be ester/alcohol blends and preferably normal propyl acetate and ethanol in a ratio of 20:1 to 30:1.

The ink preferably comprises low solids, high viscosity binders. Preferably, the pigment to binder ratio is in the range of 10:1 to 1:10 by weight. More preferably, the pigment to binder ratio is by weight in the range of 6:1 to 1:6, and even more preferably 4:1 to 1:4. Most preferably the pigment to binder ratio is from 3:1 to 1:3.

The metal pigment content by weight of the composition may be less than 10%. Preferably the pigment content by weight of the composition is less than 6%, more preferably in the range of 0.1% to 6%, even more preferably in the range 0.1% to 3%, more preferably still in the range 0.2% to 2% by weight. In another embodiment of the present invention the metal pigment content of the ink may be the range of 2% to 4% by weight, and preferably 3%.

An example of a metallic ink suitable for use in the methods and apparatus of the present invention is disclosed in WO05/051675, WO2005049745 and PCT/EP2009/066659.

The ink comprises, as in the case of an ordinary printing ink, the metal flakes, especially aluminium flakes, a binder, an auxiliary agent, and the like.

With respect to the binder resin, a thermoplastic resin may be used, examples of which include, polyethylene based polymers [polyethylene (PE), ethylene-vinyl acetate copolymer (EVA), vinyl chloride-vinyl acetate copolymer, vinyl alcohol-vinyl acetate copolymer, polypropylene (PP), vinyl based polymers [poly(vinyl chloride) (PVC), poly(vinyl butyral) (PVB), poly(vinyl alcohol) (PVA), poly(vinylidene chloride) (PVdC), poly(vinyl acetate) (PVAc), poly(vinyl formal) (PVF)], polystyrene based polymers [polystyrene (PS), styrene-acrylonitrile copolymer (AS), acrylonitrile-butadiene-styrene copolymer (ABS)], acrylic based polymers [poly(methyl methacrylate) (PMMA), MMA-styrene copolymer], polycarbonate (PC), celluloses [ethyl cellulose (EC), cellulose acetate (CA), propyl cellulose (CP), cellulose acetate butyrate (CAB), cellulose nitrate (CN)], fluorin based polymers [polychlorofluoroethylene (PCTFE), polytetrafluoroethylene (PTFE), tetrafluoroethylene-hexafluoroethylene copolymer (FEP), poly(vinylidene fluoride) (PVdF)], urethane based polymers (PU), nylons [type 6, type 66, type 610, type 11], polyesters (alkyl) [polyethylene terephthalate (PET), polybutylene terephthalate (PBT), polycyclohexane terephthalate (PCT)], novolac type phenolic resins, or the like. In addition, thermosetting resins such as resol type phenolic resin, a urea resin, a melamine resin, a polyurethane resin, an epoxy resin, an unsaturated polyester and the like, and natural resins such as protein, gum, shellac, copal, starch and rosin may also be used.

Furthermore, to the binder, a plasticizer for stabilizing the flexibility and strength of the print film and a solvent for adjusting the viscosity and drying property thereof may be added according to the needs therefor. The solvent may comprise any one or more of an ester, such as n-propyl acetate, iso-propyl acetate, ethyl acetate, butyl acetate; an alcohol, such as ethyl alcohol, industrial methylated spirits, isopropyl alcohol or normal propyl alcohol; a ketone, such as methyl ethyl ketone or acetone; an aromatic hydrocarbon, such as xylene and toluene. A solvent of a low boiling temperature of about 100° C. and a petroleum solvent of a high boiling temperature of 250° C. or higher, may be used according to the type of the printing method. An alkylbenzene or the like, for example may be used as a solvent of a low boiling temperature. Examples of solvents are ethoxypropanol, methylethylketon, methoxypropylacetate, diacetonalcohol etc.

Further in addition, an auxiliary agent including a variety of reactive agents for improving drying property, viscosity, and dispersibility, may suitably be added. The auxiliary agents are to adjust the performance of the ink, and for example, a compound that improves the abrasion resistance of the ink surface and a drying agent that accelerates the drying of the ink, and the like may be employed.

A photopolymerization-curable resin or an electron beam curable resin wherein a solvent is not used may also be employed as a binder resin that is a principal component of the vehicle. The examples thereof include an acrylic resin, and specific examples of acrylic monomers commercially available are shown below.

A monofunctional acrylate monomer that may be used includes for example, 2-ethylhexyl acrylate, 2-ethylhexyl-EO adduct acrylate, ethoxydiethylene glycol acrylate, 2-hydroxyethyl acrylate, 2-hydroxypropyl acrylate, 2-hydroxyethyl acrylate-caprolactone addduct, 2-phenoxyethyl acrylate, phenoxydiethylene glycol acrylate, nonyl phenol-EO adduct acrylate, (nonyl phenol-EO adduct)-caprolactone adduct acrylate, 2-hydroxy-3-phenoxypropyl acrylate, tetrahydrofurfuryl acrylate, furfuryl alcohol-caprolactone adduct acrylate, acryloyl morpholine, dicyclopentenyl acrylate, dicyclopentanyl acrylate, dicyclopentenyloxyethyl acrylate, isobornyl acrylate, (4,4-dimethyl-1,3-dioxane)-caprolactone adduct acrylate, (3-methyl-5,5-dimethyl-1,3-dioxane)-caprolactone adduct acrylate, and the like.

A polyfunctional acrylate monomer that may be used includes hexanediol diacrylate, neopentyl glycol diacrylate, polyethylene glycol diacrylate, tripropylene glycol diacrylate, neopentyl glycol hydroxypivalate diacrylate, (neopentyl glycol hydroxypivalate)-caprolactone adduct diacrylate, (1,6-hexanediol diglycidyl ether)-acrylic acid adduct, (hydroxypivalaldehyde-trimethylolpropane acetal)diacrylate, 2,2-bis[4-(acryloyloxydiethoxy)phenyl]propane, 2,2-bis[4-(acryloyloxydiethoxy)phenyl]methane, hydrogenated bisphenol A-ethylene oxide adduct diacrylate, tricyclodecanedimethanol diacrylate, trimethylolpropane triacrylate, pentaerithritol triacrylate, (trimethylolpropane-propylene oxide) adduct triacrylate, glycerine-propylene oxide adduct triacrylate, a mixture of dipentaerithritol hexaacrylate and pentaacrylate, esters of dipentaerithritol and lower fatty acid and acrylic acid, dipentaerithritol-caprolactone adduct acrylate, tris(acryloyloxyethyl) isocyanurate, 2-acryloyloxyethyl phosphate, and the like.

Inks comprising the above resins are free of solvent and are so constituted as to polymerize in chain reaction upon irradiation by an electron beam or electromagnetic waves.

With respect to inks of ultraviolet-irradiation type among these inks, a photopolymerization initiator, and depending on the needs therefor, a sensitizing agent, and auxiliary agents such as a polymerization inhibitor and a chain transfer agent, and the like may be added thereto.

With respect to photo-polymerization initiators, there are, (1) an initiator of direct photolysis type including an aryl-alkyl ketone, an oxime ketone, an acylphosphine oxide, or the like, (2) an initiator of radical polymerization reaction type including a benzophenone derivative, a thioxanthone derivative, or the like, (3) an initiator of cationic polymerization reaction type including an aryl diazonium salt, an aryl iodinium salt, an aryl sulfonium salt, and an aryl acetophenone salt, or the like, and in addition, (4) an initiator of energy transfer type, (5) an initiator of photoredox type, (6) an initiator of electron transfer type, and the like. With respect to the inks of electron beam-curable type, a photo-polymerization initiator is not necessary and a resin of the same type as in the case of the ultraviolet-irradiation type inks can be used, and various kinds of auxiliary agent may be added thereto according to the needs therefor.

The inks comprise a total content of metal, especially aluminum pigment of from 0.1 to 20% by weight, preferably 0.1-10% by weight based on the total weight of the ink.

Preferably, the thickness of the metallic ink when deposited on a substrate is sufficiently thin as to permit the transmission of light therethrough. Preferably, when the substrate carrying the metallised image or pattern is subsequently over-laid onto printed pictures and/or text, or the substrate is pre-printed with pictures and/or text and the metallised image or pattern is deposited thereon those printed features are visible through the metallic ink coated optically variable image or device.

The binder may comprise any one or more selected from the group comprising polyvinyl butyral, nitro cellulose, vinyl chloride, vinyl acetate copolymers, vinyl, acrylic, urethane, polythyleneterephthalate, terpene phenol, polyolefin, silicone, cellulose, polyamide, polyester, rosin ester resins. The preferred binder is 50% nitrocellulose (ID nitrocellulose DHL120/170 and nitrocellulose DLX30/50 supplied by Nobel Industries) 50% polyurethane (ID Neorez U335 supplied by Avecia). The solvents may be ester/alcohol blends and preferably normal propyl acetate and ethanol in a ratio of 20:1 to 30:1.

The present invention is also directed to a paper product obtainable using the method of the present invention. The paper product may be a banknote, an identification document like a passport, an identification card, a drivers license, a packaging material, e.g. a label, folding carton, paper bag for pharmaceuticals, apparel, software, cosmetic, tobacco or any other product to be decorated or prone to counterfeiting or forgery; and can be used for preventing forgery.

The possibility of counterfeiting decreased further by adding thermo- or photochromic dyes, UV/IR fluorescent dyes, magnetic stripes etc. into the OVD primer or ink.

Referring to FIG. 2 a paper substrate 100, UV curable lacquer 102 and holographic or other sub-microscopic diffraction grating 104 with metallic ink 106 printed over with the image viewable through the first surface 108 only.

Various features and aspects of the present invention are illustrated further in the examples that follow. While these examples are presented to show one skilled in the art how to operate within the scope of this invention, they are not to serve as a limitation on the scope of the invention where such scope is only defined in the claims. Unless otherwise indicated in the following examples and elsewhere in the specification and claims, all parts and percentages are by weight, temperatures are in degrees centigrade and pressures are at or near atmospheric.

EXAMPLES

Example 1 and 2

Various photoinitiators are mixed with UV lacquer and are applied using a 4 micron thick wirereound bar coater onto paper and board. The coated paper is laminated with the original shim under a pressure of 1 kg. Samples are exposed to a medium pressure mercury lamp (IST Metz GmbH, Nurtingen, DE, 150 Watt/cm/300 mm width) and a medium pressure mercury discharge lamp gallium doped (IST Metz GmbH, Nurtingen, DE, 150 Watt/cm/300 mm width) through the paper or board at different belt speeds and different lamp outputs to modify the light dose. The curing of the varnish and transfer of the OVD image is assessed. "Speed" is the maximum obtainable printing speed resulting in a fully cured varnish.

All percentages given are % by weight.

The composition of the UV lacquer is shown below:

| UV lacquer | % by weight |
| --- | --- |
| Tripropylene glycol diacrylate (TPGDA) | 1-25 |
| Dipropylene glycol diacrylate (DPGDA) | 30-45 |
| Ethoxylated trimethylol propane triacrylate (TMEOPTA) | 10-50 |
| Reactive tertiary amine | 1-15 |

-continued

| Photoinitiator No. | Chemical structure |
|---|---|
| 1 | (1-hydroxycyclohexyl phenyl ketone structure) |
| 2 | (2-(dimethylamino)-2-[(4-methylphenyl)methyl]-1-[4-(4-morpholinyl)phenyl]-1-butanone structure) |
| 3 | (2,4,6-trimethylbenzoyl-diphenylphosphine oxide structure) |
| 4 | (bis(2,4,6-trimethylbenzoyl)-phenylphosphine oxide structure) |
| 5 | (mixture: bis(2,4,6-trimethylbenzoyl)-phenylphosphine oxide — 9 parts; and 2,4,6-trimethylbenzoyl-phenylphosphinic acid ethyl ester (OC$_2$H$_5$) — 91 parts) |

Example 1

Application on 70 Micron Thick Label Paper

| 5% Photoinitiator No. | Dose | Speed | Result |
|---|---|---|---|
| Medium pressure mercury discharge lamp | | | |
| 1 comparative | 150 W/cm | 10 m/min | Bad |
| 2 | 150 W/cm | 60 m/min | Medium |

-continued

| 5% Photoinitiator No. | Dose | Speed | Result |
|---|---|---|---|
| 3 | 80 W/cm | 80 m/min | Excellent |
| 4 | 80 W/cm | 80 m/min | Excellent |
| Medium pressure mercury lamp gallium doped | | | |
| 1 comparative | 150 W/cm | 30 m/min | Bad |
| 2 | 80 W/cm | 40 m/min | Good |

Example 2

Application on 250 Micron Thick Carton Board

| 5% Photoinitiator No. | Dose | Speed | Result |
|---|---|---|---|
| | Medium pressure mercury discharge lamp | | |
| 1 comparative | 150 W/cm | 10 m/min | Bad |
| 2 | 150 W/cm | 20 m/min | Bad |
| 3 | 150 W/cm | 40 m/min | Medium |
| 4 | 150 W/cm | 60 m/min | Good |
| | Medium pressure mercury lamp galium doped | | |
| 1 comparative | 150 W/cm | 10 m/min | Bad |
| 2 | 150 W/cm | 30 m/min | Bad |
| 3 | 150 W/cm | 60 m/min | Good |
| 4 | 80 W/cm | 80 m/min | Excellent |

-continued

| 5% Photoinitiator No. | Dose | Speed | Result |
|---|---|---|---|
| 3 | 80 W/cm | 80 m/min | Excellent |
| 4 | 80 W/cm | 80 m/min | Excellent |

Example 3 and 4

Example 1 is repeated, except that UV lacquer is not applied by using a 4 micron thick wireround bar coater, but by gravure printing. The paper substrate is coated with a UV lacquer in a thickness of 3 g/m² using a gravure cylinder, it further runs on a chilled magnetic cylinder which is wrapped with a Nickel shim. The UV varnish coated paper substrate is pressed against the shim with two nip rollers. It is simultaneously embossed with the OVD structure and cured with UV light through the paper substrate. The substrate is then peeled off the magnetic cylinder and shim (Printing press: Rotova press (Rotocolor AG), maximal printing speed: 110 m/min, coated UV varnish thickness: 3 g/m²; UV lamp: GEW 200 Watt-medium pressure mercury lamp—300 mm width—dichroic reflector—GEW 180 Watt medium pressure mercury lamp gallium doped, UV lamp max 180 Watt/cm). The curing of the varnish and transfer of the OVD image is assessed. "Speed" is the maximum obtainable printing speed resulting in a fully cured varnish.

| 5% Photoinitiator No. | Dose | Speed | Result |
|---|---|---|---|
| | Medium pressure mercury discharge lamp | | |
| 1 comparative | 180 W/cm | 50 m/min | Medium |
| | Medium pressure mercury lamp gallium doped | | |
| 4 | 110 W/cm | 110 m/min | Excellent |

Example 4

Application on 250 Micron Thick Carton Board by Gravure Printing

| 5% Photoinitiator No. | Dose | Speed | Result |
|---|---|---|---|
| | Medium pressure mercury discharge lamp | | |
| 1 comparative | 180 W/cm | 8 m/min | Bad |
| | Medium pressure mercury lamp gallium doped | | |
| 4 | 180 W/cm | 55 m/min | Excellent |

Bad: OVD image partially transferred, no brightness, poor printing performance.

Medium: OVD image partially transferred, poor brightness, limited printing performance.

Good: OVD image fully transferred, good brightness, acceptable printing performance.

Excellent: OVD image fully transferred, high brightness, excellent printing performance.

High speed printing at minimal UV power intensity can be achieved by using a gallium doped lamp and a UV varnish formulation based on a mono, or a bisacylphosphine oxide compound on 250 micron thick paper board and 70 micron thick paper.

Example 5

Substrates that tend to absorb low viscosity lacquers are pre-coated with a cationic fully hydrolyzed polyvinylamine dispersion, and are dried at 100° C. The coated dispersion blocks the substrate surface and enables the printing of any lacquer on the surface of the substrate.

The polyvinylamine dispersion is characterized as follows:

- aqueous solution of a polymer based on viny amine and N-vinylformamide with a solid content of 20-22% as measured according to DIN EN ISO 3251 (2 h, 120° C.);
- pH value 7.0-9.0 as measured according to DIN 19268 (measured with the undiluted substance);
- dynamic viscosity 500-2500 mPa s as measured according to DIN EN ISO 2555 (RV (Spindle 3, 20 1/min).

The polyamine dispersion is coated onto the surface of Xerox® copy paper 80 g/m² (Table 5.1) by means of a wire bar with a thickness of 4 micron, 6 micron or 12 micron wet film. The coated film is air dried and subsequently coated with 6 micron UV lacquer as described in example 1 and 2 by means of a wire and embossed on a shim containing OVD images, and cured under UV light through the paper.

Table 5.1 of Xerox ® copy paper 80 g/m², 5% Photoinitiator 5

| Polyvinyle amine dispersion | OVD image visibility |
|---|---|
| No coating | No image |
| 4 micron wet film thickness | Good |
| 6 micron wet film thickness | Excellent |
| 12 micron wet film thickness | Excellent |

Other tested substrates are:

TABLE 5.2

Banknote paper 120 micron thickness 10% Photoinitiator 5

| Polyvinyle amine dispersion | OVD image visibility |
|---|---|
| No coating | No image |
| 12 micron wet film thickness | Excellent |

TABLE 5.3

Velin paper 135 micron thickness 10% Photoinitiator 5

| Polyvinyle amine dispersion | OVD image visibility |
|---|---|
| No coating | No image |
| 12 micron wet film thickness | Excellent |

TABLE 5.4

Velum paper 100 micron thickness 10% Photoinitiator 5

| Polyvinyle amine dispersion | OVD image visibility |
|---|---|
| No coating | No image |
| 12 micron wet film thickness | Excellent |

TABLE 5.5

Tax stamp paper 85 micron 5% Photoinitiaor 5

| Polyvinyle amine dispersion | OVD image visibility |
|---|---|
| No coating | No image |
| 12 micron wet film thickness | Excellent |

The invention claimed is:

1. A method for forming a surface relief microstructure on a paper substrate, the method comprising:
   A) applying a curable composition to at least a portion of a frontside of a paper substrate;
   B) contacting at least a portion of the curable composition with a surface relief microstructure;
   C) curing the curable composition with a UV lamp, which is arranged on a backside of the paper substrate, to form a cured composition; and
   D) depositing a metallic layer, and optionally a layer of a transparent high refractive index material, on at least a portion of the cured composition, wherein:
the UV lamp has an emission peak in a UV-A range of 320 nm to 400 nm and additionally in a near VIS range of 400 nm to 450 nm;
the curable composition comprises a photoinitiator which absorbs in the UV-A range and also in the near VIS range;
the photoinitiator is a mixture comprising a compound formula (XII):

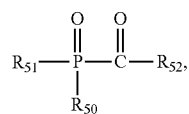

(XII)

in which:
$R_{50}$ is an unsubstituted cyclohexyl, cyclopentyl, phenyl, naphthyl or biphenyl, or is a cyclohexyl, cyclopentyl, phenyl, naphthyl or biphenyl substituted by one or more halogen, $C_1$-$C_{12}$alkyl, $C_1$-$C_{12}$alkoxy, $C_1$-$C_{12}$alkylthio or by $NR_{53}R_{54}$, or $R_{50}$ is an unsubstituted $C_1$-$C_{20}$alkyl or is a $C_1$-$C_{20}$alkyl which is substituted by one or more halogen, $C_1$-$C_{12}$alkoxy, $C_1$-$C_{12}$alkylthio, $NR_{53}R_{54}$ or by —(CO)—O—$C_1$—$C_{24}$alky,
$R_{51}$ is —(CO)$R'_{52}$,
$R_{52}$ and $R'_{52}$ independently of each other are an unsubstituted cyclohexyl, cyclopentyl, phenyl, naphthyl or biphenyl, or are a cyclohexyl, cyclopentyl, phenyl, naphthyl or biphenyl substituted by one or more halogen, $C_1$-$C_4$alkyl or $C_1$-$C_4$alkoxy, or $R_{52}$ is a 5- or 6-membered heterocyclic ring comprising an S atom or N atom, and
$R_{53}$ and $R_{54}$ independently of one another are hydrogen, an unsubstituted $C_1$-$C_{12}$alkyl or a $C_1$-$C_{12}$alkyl substituted by one or more OH or SH wherein the alkyl chain optionally is interrupted by one to four oxygen atoms, or $R_{53}$ and $R_{54}$ independently of one another are $C_2$-$C_{12}$-alkenyl, cyclopentyl, cyclohexyl, benzyl or phenyl;
the mixture further comprises at least one selected from the group consisting of a monoacylphosphine oxide compound, a benzophenone compound, an alpha-amino ketone compound, an alpha-hydroxy ketone compound, an alpha-alkoxyketone compound, a phenyl glyoxylate compound, an oxime ester compound, and an onium salt compound;
the metallic layer is deposited by applying a metal-based ink on the cured composition;
the metal-based ink comprises metal pigment particles, a binder, optionally a solvent, optionally a colorant and optionally an auxiliary agent;
the metal pigment particles comprise platelet-shaped metal particles having a longest dimension of edge length of from 15 nm to 1000 nm and a thickness of from 2 nm to 100 nm: and
the curing of the curable composition with the UV lamp, arranged on the backside of paper substrate, fully cures the curable composition.

2. The method according to claim 1, wherein the UV lamp is a gallium, or iron doped medium pressure mercury lamp.

3. The method according to claim 1, wherein the mixture comprises the compound of formula (XII) and a monoacyiphosphine oxide compound.

4. The method according to claim 1, wherein the curable composition comprises:
   (a) from 1.0 to 20.0% by weight of the photoinitiator; and
   (b) from 99.0 to 80.0% by weight of a resin comprising at least one polymerizable compound,
wherein a sum of the photoinitiator and the resin equals 100%.

5. The method according to claim 1, wherein the contacting of the surface relief microstructure occurs by contacting the portion of the curable composition with a shim selected from the group consisting of a nickel sleeve, a nickel plate, an etched metallic drum, a laser imaged metallic drum, and other material mounted on an opaque cylinder or metal cylinder comprising an OVD image on a surface thereof.

6. The method according to claim 5, wherein the shim is a nickel plate mounted on an opaque cylinder or metal cylinder and comprising the OVD image on the surface.

7. The method according to claim 1, wherein the paper substrate is selected from the group consisting of a regular paper, a banknote paper, a synthetic paper, and a polymer banknote substrate.

8. The method according to claim 1, further comprising treating a paper or board with a cationic polymer on the frontside before applying* the curable composition to at least a portion of the frontside of the paper substrate.

9. The method according to claim 8, wherein the cationic polymer is a polyvinylamine.

10. The method according to claim 1, wherein the mixture comprises the compound of formula (XII), a monoacylphosphine oxide compound and at least one selected from the group consisting of a benzophenone compound., an alpha-amino ketone compound, an alpha-hydroxyketone compound, an alpha-alkoxyketone compound, a phenyl glyoxylate compound, an oxime ester compound, and an onium salt compound.

11. The method of claim 1, wherein the photoinitiator is a mixture comprising bis(2,4,6-trimethyl benzoyl)-phenyl-phosphine oxide and at least one selected from the group consisting of 2,4,6-trimethylbenzoyl-diphenyl-phosphine oxide, (2,4,6-trimethylbenzoyl)-2,4-dipentoxyphenyl phosphine oxide, and bis(2,6-dimethoxybenzoyl)-2,4,4-trimethylpentylphosphine oxide.

12. The method according to claim 1, wherein the metal pigment particles further comprise spherical metal particles.

13. The method according to claim 1, wherein a content of the metal pigment particles in the metal-based ink ranges from 0.1% to 2% by weight.

14. The method according to claim 1, wherein the metal-based ink comprises a plasticizer.

15. The method according to claim 1, wherein the metallic layer is deposited on the entire portion of the cured composition.

16. The method according to claim 1, wherein the mixture comprises the compound of formula (XII) and at least one selected from the group consisting of a phenyl glyoxylate compound, an oxime ester compound, and an onium salt compound.

17. The method according to claim 1, wherein only a portion of the paper substrate is printed with the curable composition, the surface relief microstructure, and the metallic layer.

* * * * *